(12) United States Patent
Lin

(10) Patent No.: US 8,614,772 B2
(45) Date of Patent: Dec. 24, 2013

(54) MULTI-FUNCTIONAL LIQUID CRYSTAL PARALLAX BARRIER DEVICE

(75) Inventor: Ming-Yen Lin, Taipei (TW)

(73) Assignee: Unique Instruments Co. Ltd, Taipei (TW)

( * ) Notice: Subject to any disclaimer, the term of this patent is extended or adjusted under 35 U.S.C. 154(b) by 218 days.

(21) Appl. No.: 13/070,165

(22) Filed: Mar. 23, 2011

(65) Prior Publication Data

US 2011/0234929 A1 Sep. 29, 2011

(30) Foreign Application Priority Data

Mar. 23, 2010 (TW) .............................. 99108528 A

(51) Int. Cl.
*G02F 1/1335* (2006.01)
*G02F 1/13* (2006.01)

(52) U.S. Cl.
USPC .............................................. 349/15; 349/1

(58) Field of Classification Search
USPC ......................................................... 349/15
See application file for complete search history.

(56) References Cited

U.S. PATENT DOCUMENTS

| | | | | |
|---|---|---|---|---|
| 7,623,188 B2 * | 11/2009 | Hamagishi | | 349/8 |
| 7,834,944 B2 * | 11/2010 | Otte et al. | | 349/15 |
| 7,920,216 B2 * | 4/2011 | Hsu et al. | | 349/15 |
| 8,144,079 B2 * | 3/2012 | Mather et al. | | 345/32 |
| 2004/0109115 A1 * | 6/2004 | Tsai et al. | | 349/117 |
| 2007/0236619 A1 * | 10/2007 | Kuo | | 349/15 |
| 2008/0278639 A1 * | 11/2008 | Hamagishi | | 349/8 |
| 2009/0167968 A1 * | 7/2009 | Hsu et al. | | 349/15 |
| 2010/0103334 A1 * | 4/2010 | Otte et al. | | 349/15 |
| 2011/0170026 A1 * | 7/2011 | Lin | | 349/15 |
| 2011/0222017 A1 * | 9/2011 | Lin | | 349/201 |
| 2011/0234929 A1 * | 9/2011 | Lin | | 349/15 |

* cited by examiner

*Primary Examiner* — Rhonda Peace
(74) *Attorney, Agent, or Firm* — WPAT, PC; Justin King

(57) ABSTRACT

A multi-functional liquid crystal parallax barrier device is a liquid crystal device mainly formed by two parallax barrier structures, namely, a double-view vertical strip parallax barrier and a multi-view slant-and-step parallax barrier, in which the two parallax barriers are respectively disposed corresponding to different screen display directions, so as to display a double-view 3D image and a multi-view 3D image in different display directions, in addition to displaying a 2D image, through the control of an appropriate driving voltage and the use of a flat panel display screen.

14 Claims, 27 Drawing Sheets

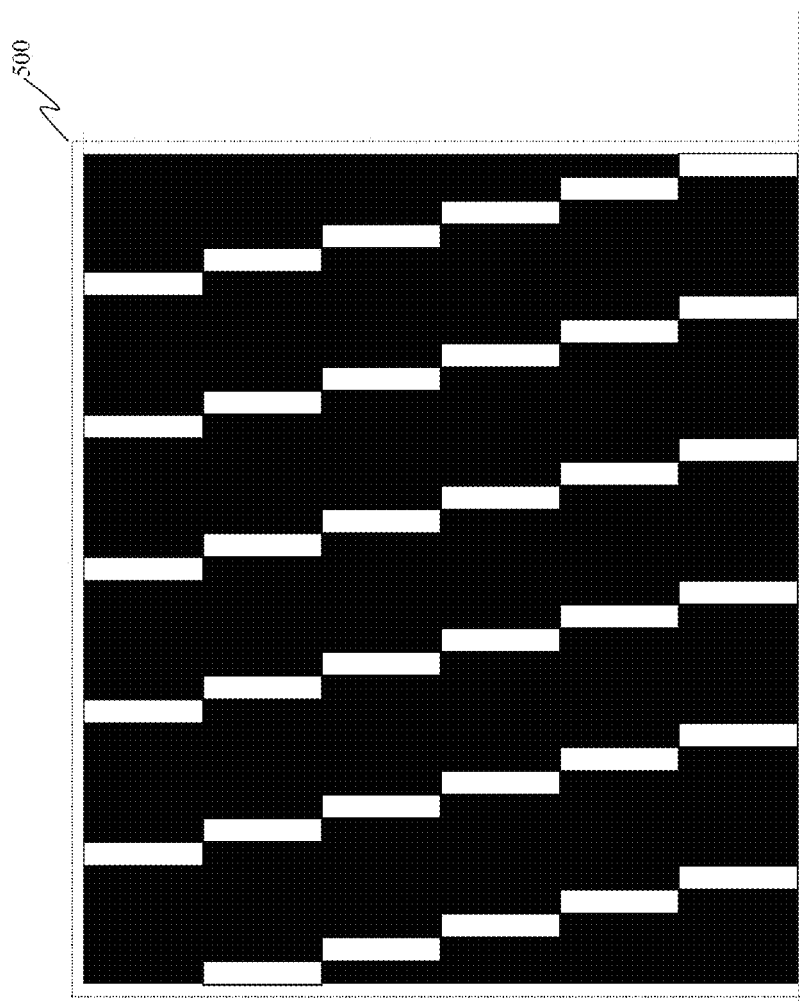
FIG. 5 (Prior Art)
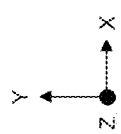

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 18 | 2 | 1 | 1 | 1 | 0 | 0 | 0 | 3 | 3 | 3 | 2 | 2 | 2 | 1 | 1 |
| 17 | 1 | 1 | 1 | 0 | 0 | 0 | 3 | 3 | 3 | 2 | 2 | 2 | 1 | 1 | 1 |
| 16 | 1 | 1 | 0 | 0 | 0 | 3 | 3 | 3 | 2 | 2 | 2 | 1 | 1 | 1 | 0 |
| 15 | 1 | 0 | 0 | 0 | 3 | 3 | 3 | 2 | 2 | 2 | 1 | 1 | 1 | 0 | 0 |
| 14 | 0 | 0 | 0 | 3 | 3 | 3 | 2 | 2 | 2 | 1 | 1 | 1 | 0 | 0 | 0 |
| 13 | 0 | 0 | 3 | 3 | 3 | 2 | 2 | 2 | 1 | 1 | 1 | 0 | 0 | 0 | 3 |
| 12 | 0 | 3 | 3 | 3 | 2 | 2 | 2 | 1 | 1 | 1 | 0 | 0 | 0 | 3 | 3 |
| 11 | 3 | 3 | 3 | 2 | 2 | 2 | 1 | 1 | 1 | 0 | 0 | 0 | 3 | 3 | 3 |
| 10 | 3 | 3 | 2 | 2 | 2 | 1 | 1 | 1 | 0 | 0 | 0 | 3 | 3 | 3 | 2 |
| 9 | 3 | 2 | 2 | 2 | 1 | 1 | 1 | 0 | 0 | 0 | 3 | 3 | 3 | 2 | 2 |
| 8 | 2 | 2 | 2 | 1 | 1 | 1 | 0 | 0 | 0 | 3 | 3 | 3 | 2 | 2 | 2 |
| 7 | 2 | 2 | 1 | 1 | 1 | 0 | 0 | 0 | 3 | 3 | 3 | 2 | 2 | 2 | 1 |
| 6 | 2 | 1 | 1 | 1 | 0 | 0 | 0 | 3 | 3 | 3 | 2 | 2 | 2 | 1 | 1 |
| 5 | 1 | 1 | 1 | 0 | 0 | 0 | 3 | 3 | 3 | 2 | 2 | 2 | 1 | 1 | 1 |
| 4 | 1 | 1 | 0 | 0 | 0 | 3 | 3 | 3 | 2 | 2 | 2 | 1 | 1 | 1 | 0 |
| 3 | 1 | 0 | 0 | 0 | 3 | 3 | 3 | 2 | 2 | 2 | 1 | 1 | 1 | 0 | 0 |
| 2 | 0 | 0 | 0 | 3 | 3 | 3 | 2 | 2 | 2 | 1 | 1 | 1 | 0 | 0 | 0 |
| 1 | 0 | 0 | 3 | 3 | 3 | 2 | 2 | 2 | 1 | 1 | 1 | 0 | 0 | 0 | 3 |
| 0 | 0 | 3 | 3 | 3 | 2 | 2 | 2 | 1 | 1 | 1 | 0 | 0 | 0 | 3 | 3 |

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0 | 4 | 4 | 4 | 3 | 3 | 3 | 2 | 2 | 2 | 1 | 1 | 1 | 0 | 0 |
| 1 | 0 | 0 | 4 | 4 | 4 | 3 | 3 | 3 | 2 | 2 | 2 | 1 | 1 | 1 | 0 |
| 2 | 0 | 0 | 0 | 4 | 4 | 4 | 3 | 3 | 3 | 2 | 2 | 2 | 1 | 1 | 1 |
| 3 | 1 | 0 | 0 | 0 | 4 | 4 | 4 | 3 | 3 | 3 | 2 | 2 | 2 | 1 | 1 |
| 4 | 1 | 1 | 0 | 0 | 0 | 4 | 4 | 4 | 3 | 3 | 3 | 2 | 2 | 2 | 1 |
| 5 | 1 | 1 | 1 | 0 | 0 | 0 | 4 | 4 | 4 | 3 | 3 | 3 | 2 | 2 | 2 |
| 6 | 2 | 1 | 1 | 1 | 0 | 0 | 0 | 4 | 4 | 4 | 3 | 3 | 3 | 2 | 2 |
| 7 | 2 | 2 | 1 | 1 | 1 | 0 | 0 | 0 | 4 | 4 | 4 | 3 | 3 | 3 | 2 |
| 8 | 2 | 2 | 2 | 1 | 1 | 1 | 0 | 0 | 0 | 4 | 4 | 4 | 3 | 3 | 3 |
| 9 | 3 | 2 | 2 | 2 | 1 | 1 | 1 | 0 | 0 | 0 | 4 | 4 | 4 | 3 | 3 |
| 10 | 3 | 3 | 2 | 2 | 2 | 1 | 1 | 1 | 0 | 0 | 0 | 4 | 4 | 4 | 3 |
| 11 | 3 | 3 | 3 | 2 | 2 | 2 | 1 | 1 | 1 | 0 | 0 | 0 | 4 | 4 | 4 |
| 12 | 4 | 3 | 3 | 3 | 2 | 2 | 2 | 1 | 1 | 1 | 0 | 0 | 0 | 4 | 4 |
| 13 | 4 | 4 | 3 | 3 | 3 | 2 | 2 | 2 | 1 | 1 | 1 | 0 | 0 | 0 | 4 |
| 14 | 4 | 4 | 4 | 3 | 3 | 3 | 2 | 2 | 2 | 1 | 1 | 1 | 0 | 0 | 0 |
| 15 | 0 | 4 | 4 | 4 | 3 | 3 | 3 | 2 | 2 | 2 | 1 | 1 | 1 | 0 | 0 |
| 16 | 0 | 0 | 4 | 4 | 4 | 3 | 3 | 3 | 2 | 2 | 2 | 1 | 1 | 1 | 0 |
| 17 | 0 | 0 | 0 | 4 | 4 | 4 | 3 | 3 | 3 | 2 | 2 | 2 | 1 | 1 | 1 |
| 18 | 1 | 0 | 0 | 0 | 4 | 4 | 4 | 3 | 3 | 3 | 2 | 2 | 2 | 1 | 1 |
| 19 | 1 | 1 | 0 | 0 | 0 | 4 | 4 | 4 | 3 | 3 | 3 | 2 | 2 | 2 | 1 |
| 20 | 1 | 1 | 1 | 0 | 0 | 0 | 4 | 4 | 4 | 3 | 3 | 3 | 2 | 2 | 2 |
| 21 | 2 | 1 | 1 | 1 | 0 | 0 | 0 | 4 | 4 | 4 | 3 | 3 | 3 | 2 | 2 |

MULTI-FUNCTIONAL LIQUID CRYSTAL PARALLAX BARRIER DEVICE

BACKGROUND OF THE INVENTION

1. Field of Invention

The present invention relates to a multi-functional liquid crystal parallax barrier device, which is a liquid crystal device mainly formed by two parallax barrier structures, namely, a double-view vertical strip parallax barrier and a multi-view slant-and-step parallax barrier, in which the two parallax barriers are respectively disposed corresponding to different screen display directions, so as to display a double-view 3D image and a multi-view 3D image in different display directions, in addition to displaying a 2D image, through the control of an appropriate driving voltage and the use of a flat panel display screen.

2. Related Art

Basically, the present invention is an application of ROC Patent Applications No. 099100423 and No. 099107311, which disclose a multi-functional liquid crystal parallax barrier device. The multi-functional liquid crystal parallax barrier device stated in ROC Patent Application No. 099100423 is a generally used structure, and is a liquid crystal parallax barrier device formed by two independent barrier electrodes, in which a voltage is respectively applied to drive the two independent barrier electrodes, so as to achieve the purpose of displaying 3D images bi-directionally or with different barrier configuration structures or with different numbers of views. FIG. 1 and FIG. 2 show the basic structure of a multi-functional liquid crystal parallax barrier device.

FIG. 1 is a schematic view of the structure of the multi-functional liquid crystal parallax barrier device according to a first embodiment of the patent. The multi-functional liquid crystal parallax barrier device 100 is mainly formed by an upper linear polarizer 101, an upper transparent substrate 102, a common electrode layer 103, an upper alignment layer 104, a liquid crystal molecular layer 105, a lower alignment layer 106, a pair of barrier electrode layers 107, a lower transparent substrate 111, and a lower linear polarizer 112. The pair of barrier electrode layers 107 is formed by an upper barrier electrode layer 108, an insulation layer 109, and a lower barrier electrode layer 110. The insulation layer 109 electrically isolates the two barrier electrode layers 108 and 110 to avoid an electrical short circuit between the two barrier electrode layers.

FIG. 2 is a schematic view of the structure of the multi-functional liquid crystal parallax barrier device according to a second embodiment of the patent. The multi-functional liquid crystal parallax barrier device 200 is mainly formed by an upper linear polarizer 201, an upper transparent substrate 202, an upper common electrode layer 203, an upper insulation layer 204, an upper barrier electrode layer 205, an upper alignment layer 206, a liquid crystal molecular layer 207, a lower alignment layer 208, a lower barrier electrode layer 209, a lower insulation layer 210, a lower common electrode layer 211, a lower transparent substrate 212, and a lower linear polarizer 213.

In addition, the multi-functional liquid crystal parallax barrier device stated in ROC Patent Application No. 099107311 is an application of ROC Patent Application No. 099100423. In the patent, when a flat panel display 300 in FIG. 3 is used to display a 3D image, firstly, a double-view vertical strip parallax barrier 400 and a multi-view slant-and-step parallax barrier 500 in FIG. 4 and FIG. 5 are respectively disposed on different barrier electrodes 108, 110 and 205, 209 of the multi-functional liquid crystal parallax barrier devices 100, 200 in the same horizontal display direction (X-axis direction). Then, the multi-functional liquid crystal parallax barrier devices 100, 200, as shown in FIG. 6, are disposed on the flat panel display 300. Through the drive of a proper external voltage, a 2D display mode or a 3D display mode may be selected. The 3D display mode includes a double-view display mode and a multi-view display mode. After the two 3D modes are actuated, the two parallax barriers 400 and 500 respectively perform a view separation on a double-view 3D combined image and a multi-view 3D combined image (not shown) at an optimal viewing point on an optimal viewing distance. Therefore, the eyes of a viewer in the horizontal direction may view the 3D image at the optimal viewing point. According to the characteristics of the Patent No. 099107311, not only a specific optical design of the light-transmissive elements of the two parallax barriers is proposed, but also optimization processes of the optimal viewing distance and the opening width of the light-transmissive element are stated in details. However, in the Patent No. 099107311, the two parallax barriers 400 and 500 are disposed in the same horizontal display direction, and thus can only display the 3D image in a single direction. Therefore, the display of the 3D image cannot satisfy the application of the display screen after rotating for 90°, that is to say, the requirement of bi-directionally displaying the 3D image fails to be achieved.

SUMMARY OF THE INVENTION

The present invention is an application of a multi-functional liquid crystal parallax barrier device stated in ROC Patent Application No. 099100423, and is also an improvement of a multi-functional liquid crystal parallax barrier device stated in ROC Patent Application No. 099107311. The provided multi-functional liquid crystal parallax barrier device is a liquid crystal device mainly formed by two parallax barrier structures, namely, a double-view vertical strip parallax barrier and a multi-view slant-and-step parallax barrier, in which the two parallax barriers are respectively disposed corresponding to different screen display directions, so as to display a double-view 3D image and a multi-view 3D image in different display directions, in addition to displaying a 2D image, through the control of an appropriate driving voltage and the use of a flat panel display screen.

BRIEF DESCRIPTION OF THE DRAWINGS

The present invention will become more fully understood from the detailed description given herein below for illustration only, and thus are not limitative of the present invention, and wherein:

FIG. 5 and FIG. 14 are schematic views of a multi-view slant-and-step parallax barrier structure;

FIG. 15 is a schematic view of a four-view 3D combined image;

FIG. 16 is a schematic view of a five-view 3D combined image;

DETAILED DESCRIPTION OF THE INVENTION

Firstly, the relation of the configuration of R, G, B sub-pixels of the display screen and the rotation of the display screen is illustrated in the following.

Figure 1:
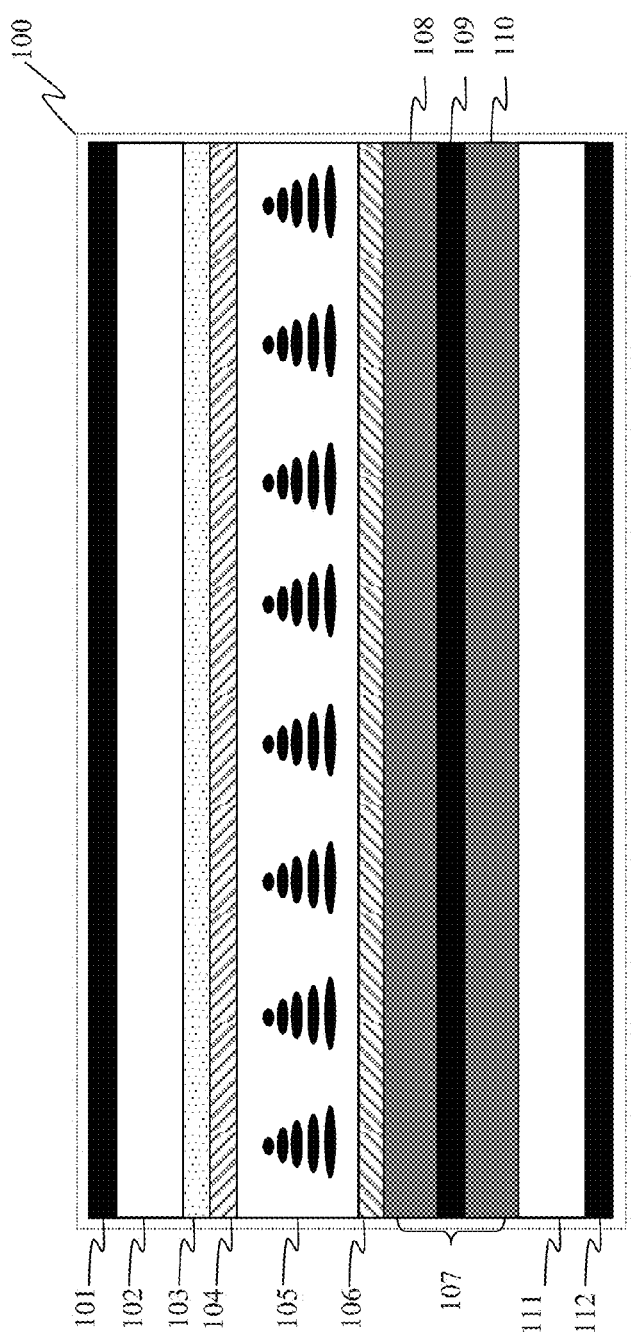
FIG. 1 and FIG. 2 are schematic views of structure of a multi-functional liquid crystal parallax barrier device.
Figure 2:
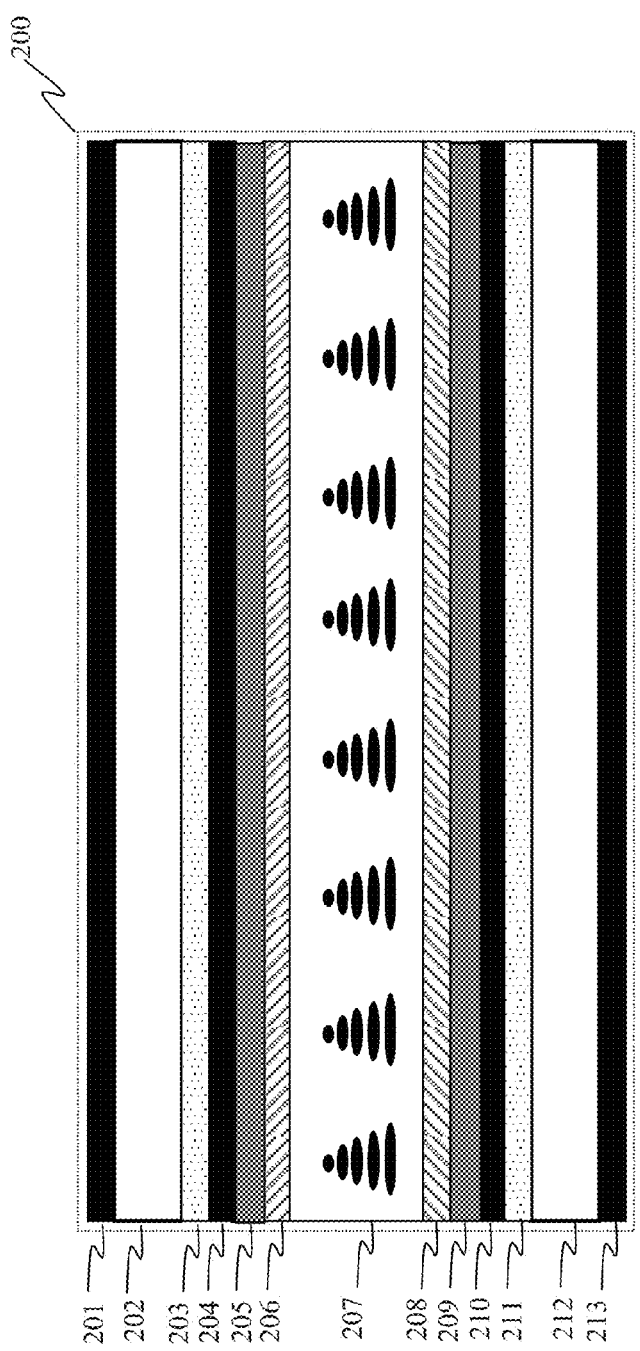
Figure 3:
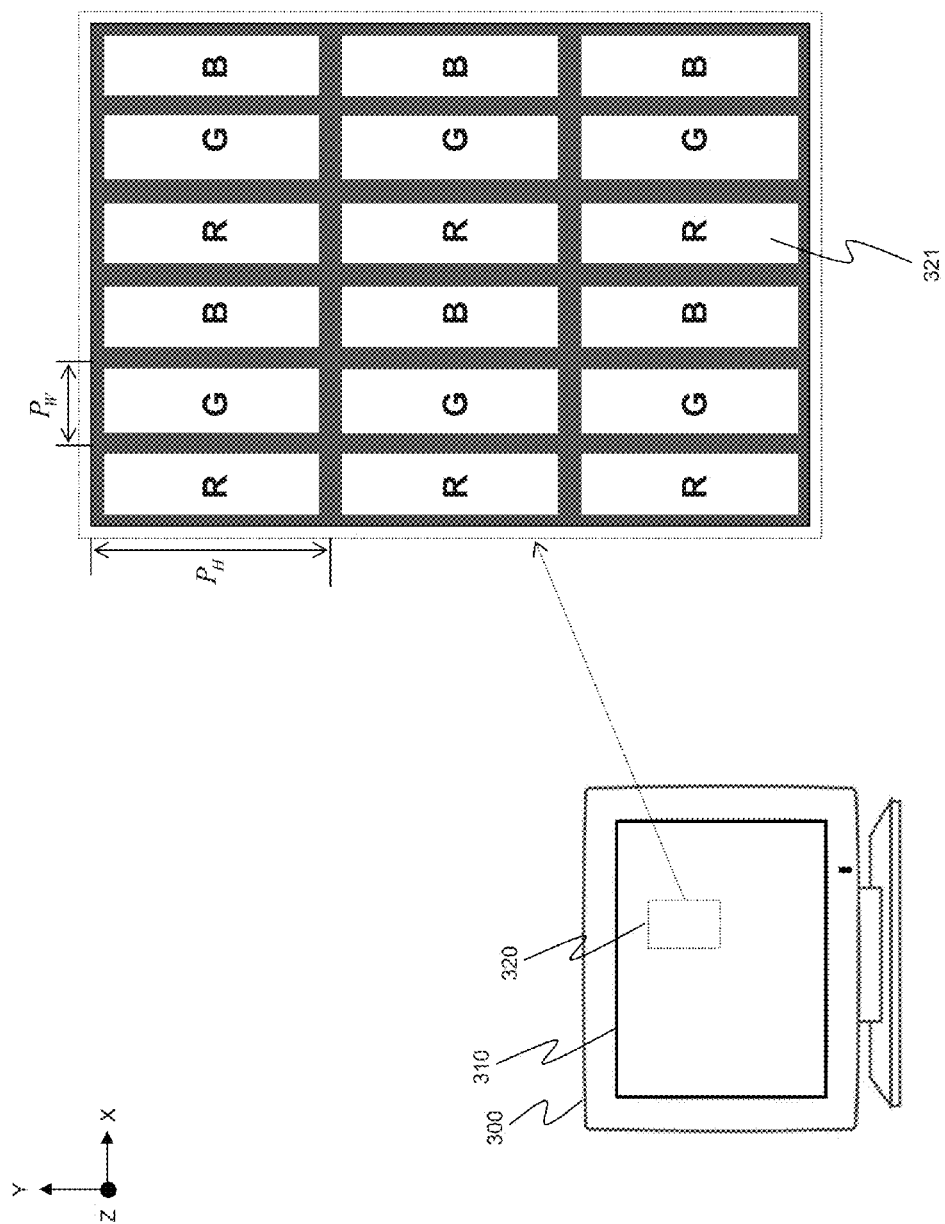
FIG. 3 is a schematic view of construction of a conventional flat panel display screen.
Figure 4:
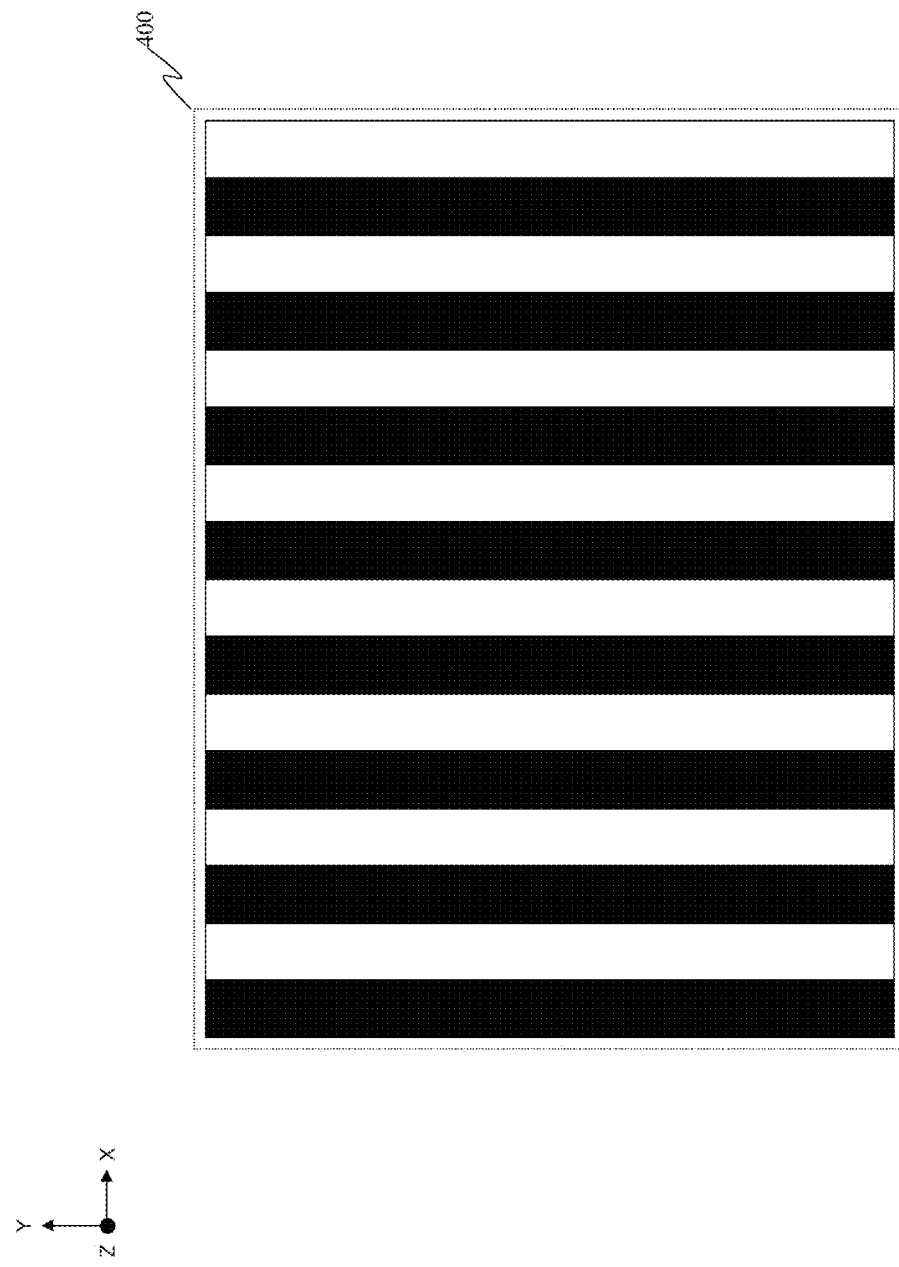
FIG. 4 is a schematic view of a double-view vertical strip parallax barrier structure.
Figure 6:
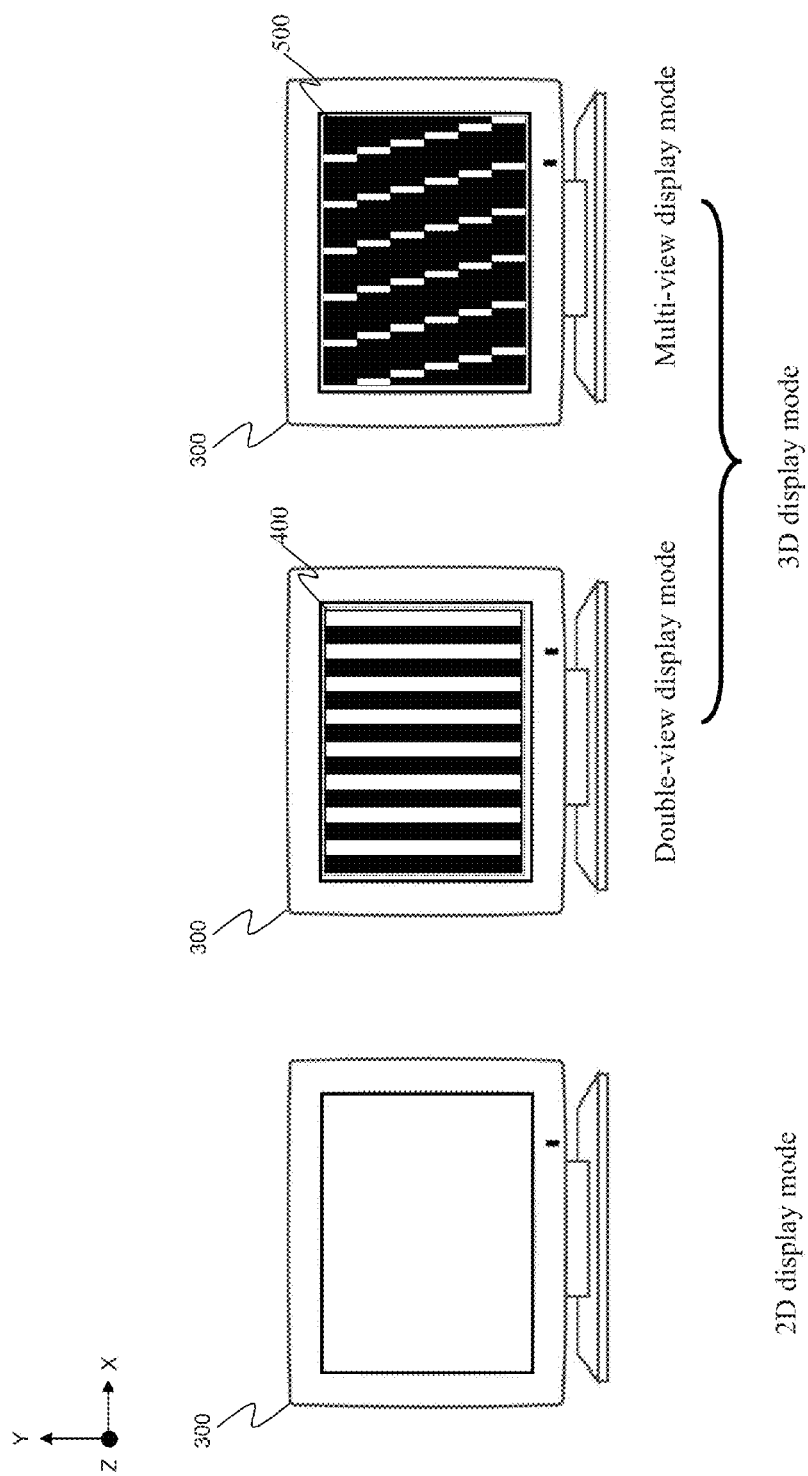
FIG. 6 is a schematic view of 2D/3D modes of a flat panel display installed with a multi-functional liquid crystal parallax barrier device.
Figure 7:
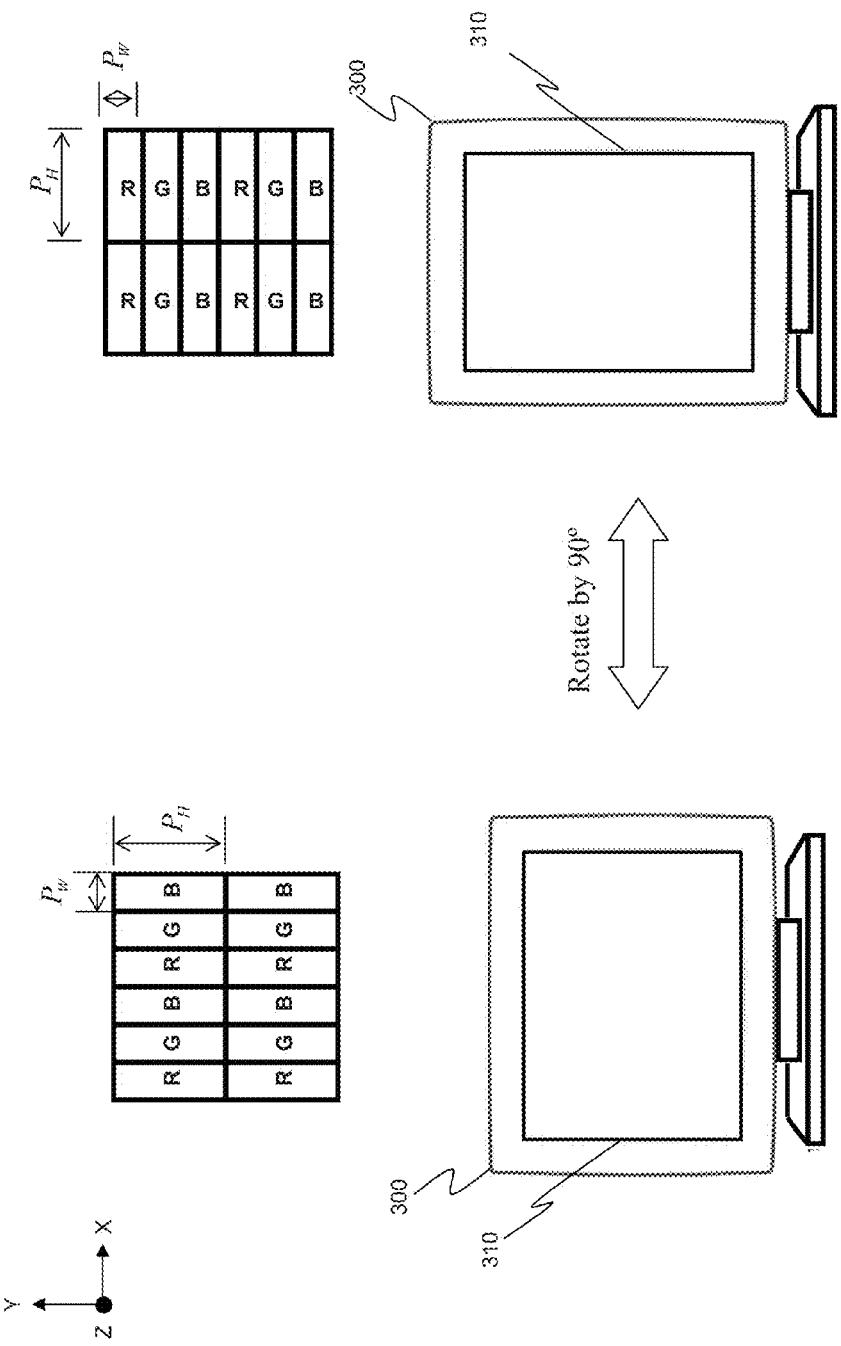
FIG. 7 is a schematic view of R, G, B sub-pixel configuration of a transversely arranged flat panel display screen in the prior art.

FIG. 7 is a schematic view of R, G, B sub-pixel configuration of a transversely arranged flat panel display screen in the prior art. The transverse arrangement, as shown in the left figure, indicates that a long edge of the screen 310 of the flat panel display 300 is disposed in the horizontal direction (X-axis direction). The screen 310 is formed by M×N R, G, B sub-pixel units, and a single R, G, B sub-pixel unit 321 has a size of $P_W \times P_H$, where $P_W$ is a short edge width of the sub-pixel and $P_H$ is a long edge width of the sub-pixel, the two satisfying the following relation:

$$P_H = 3P_W \quad (1)$$

In addition, the R, G, B sub-pixels are configured in the horizontal direction, that is, along the long edge direction of the screen. Therefore, as shown in the right figure, after the flat panel display 300 rotates clockwise for 90° (definitely, the flat panel display 300 may also rotate counterclockwise), the flat panel display 300 is longitudinally arranged, and the R, G, B sub-pixels are configured in the vertical direction (Y-axis direction).

Figure 8:
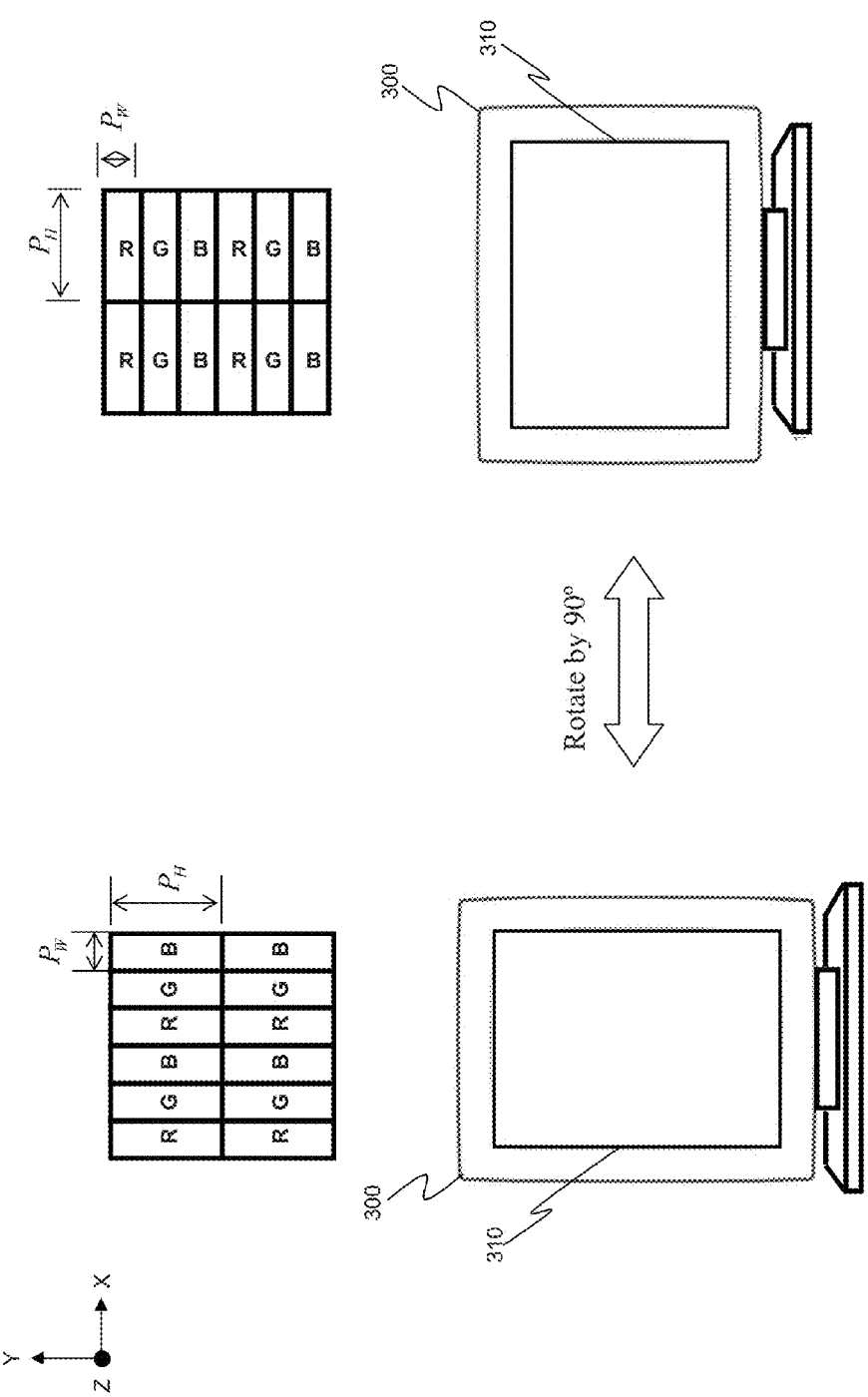
FIG. 8 is a schematic view of R, G, B sub-pixel configuration of a longitudinally arranged flat panel display screen in the prior art.

FIG. 8 is a schematic view of R, G, B sub-pixel configuration of a longitudinally arranged flat panel display screen in the prior art. The longitudinal arrangement, as shown in the left figure, indicates that the long edge of the screen 310 of the flat panel display 300 is disposed in the vertical direction (Y-axis direction). The R, G, B sub-pixels are configured in the horizontal direction. Therefore, as shown in the right figure, when the flat panel display 300 rotates clockwise for 90° (definitely, the flat panel display 300 may also rotate counterclockwise), the flat panel display 300 is transversely arranged, and the R, G, B sub-pixels are configured in the vertical direction. In addition, the flat panel display screen 310 in FIG. 7 and FIG. 8 may display a 2D image, a double-view 3D combined image by using the double-view vertical strip parallax barrier, and a multi-view 3D combined image by using the multi-view slant-and-step parallax barrier.

First Embodiment

Figure 9:
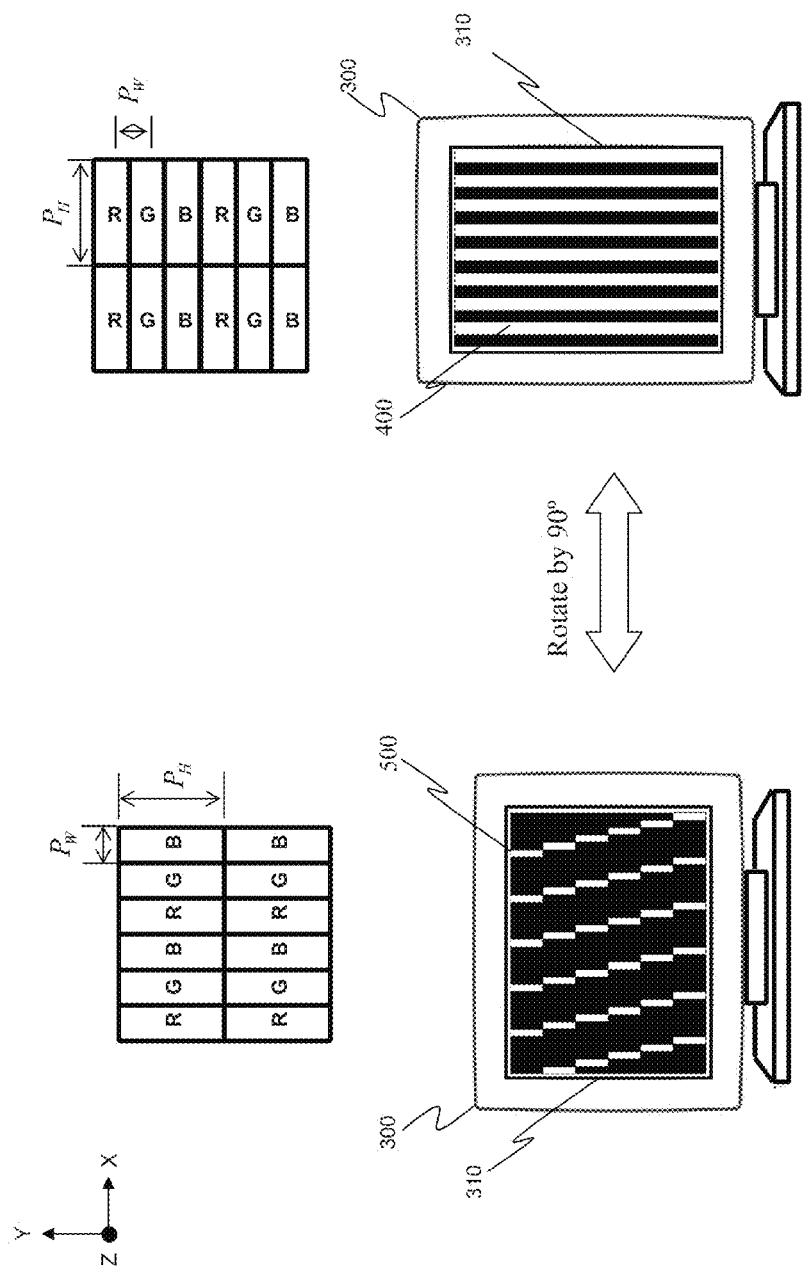
FIG. 9 and FIG. 10 are schematic views of a multi-functional liquid crystal parallax barrier according to a first embodiment of the present invention.
Figure 10:
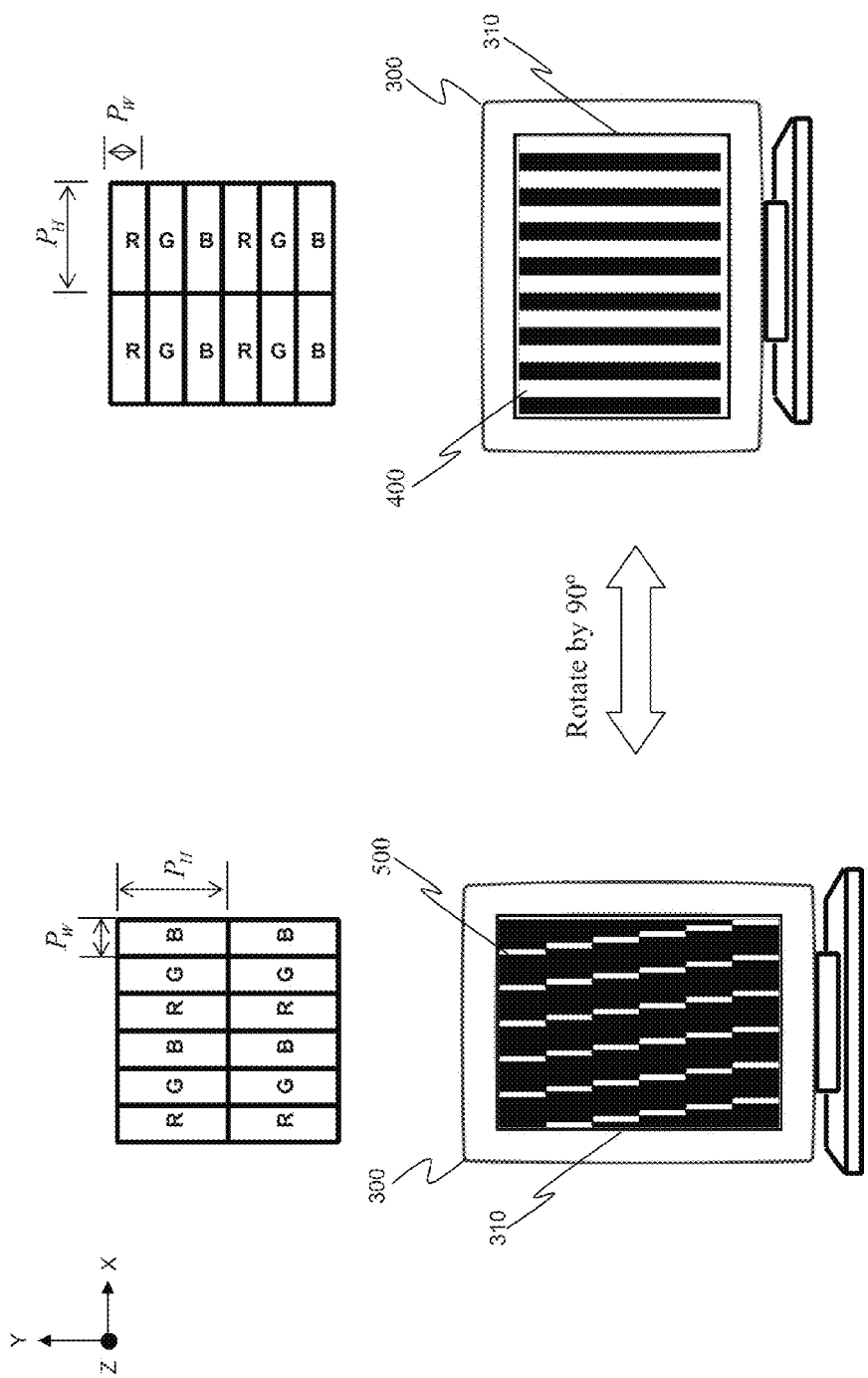

Regarding the installation direction of the double-view vertical strip parallax barrier 400 and the multi-view slant-and-step parallax barrier 500, no matter in which direction the flat panel display is arranged and no matter in which direction the R, G, B sub-pixels are configured, to bi-directionally display the 3D image, the two parallax barriers 400 and 500 are installed in the manners as shown in FIG. 9 and FIG. 10. Specifically, when the flat panel display is arranged in a manner that the R, G, B sub-pixels are configured in the vertical direction, a double-view vertical strip parallax barrier 400 is installed accordingly with a long edge of an opening of the vertical strip parallax barrier disposed in parallel to the vertical direction, and performs a view separation on the double-view 3D combined image at an optimal viewing point on an optimal viewing distance in the horizontal direction, so as to display the double-view 3D image. In addition, when the flat panel display is arranged in a manner that the R, G, B sub-pixels are configured in the horizontal direction, a multi-view slant-and-step parallax barrier 500 is installed accordingly with a barrier horizontal line structure of the multi-view slant-and-step parallax barrier (as defined in FIG. 21 and the following content) disposed in parallel to the horizontal direction, and performs a view separation on the multi-view 3D combined image at an optimal viewing point on an optimal viewing distance in the horizontal direction, so as to display the multi-view 3D image.

Second Embodiment

Figure 11:
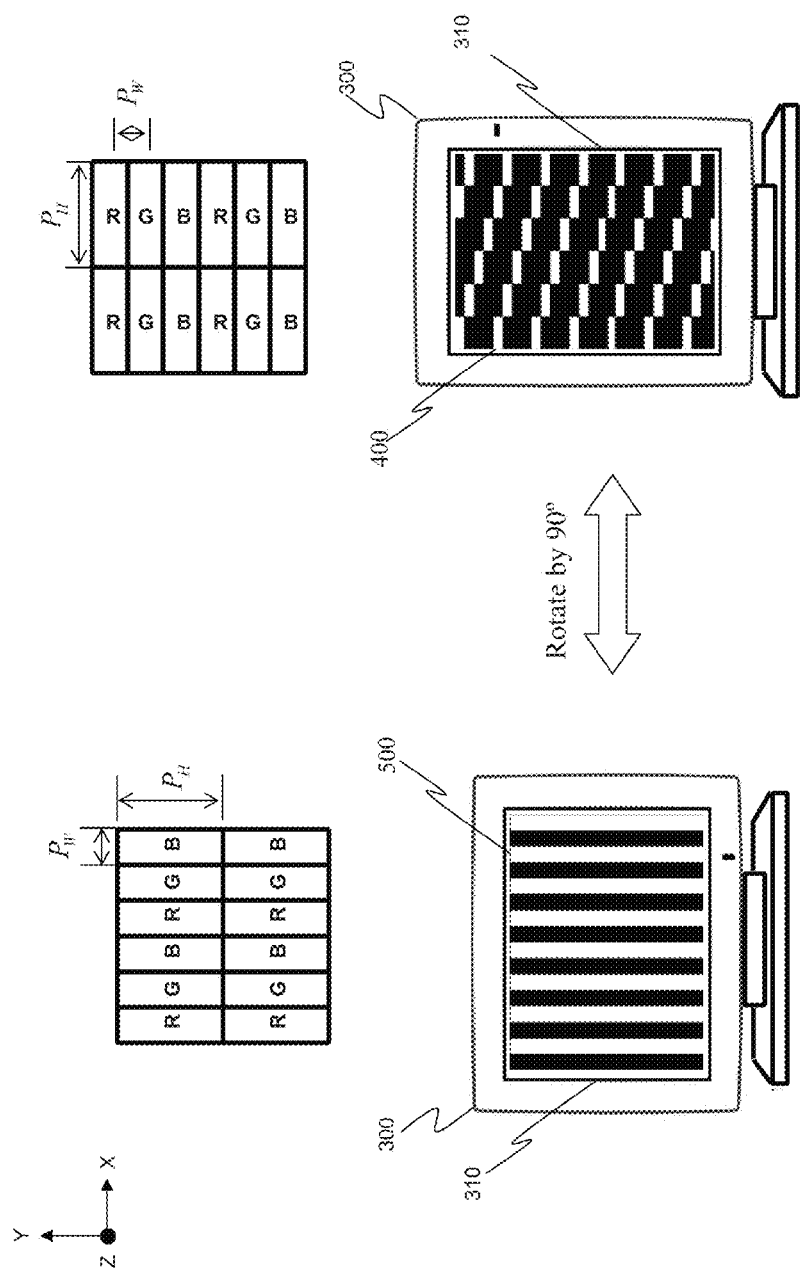
FIG. 11 and FIG. 12 are schematic views of a multi-functional liquid crystal parallax barrier according to a second embodiment of the present invention.
Figure 12:
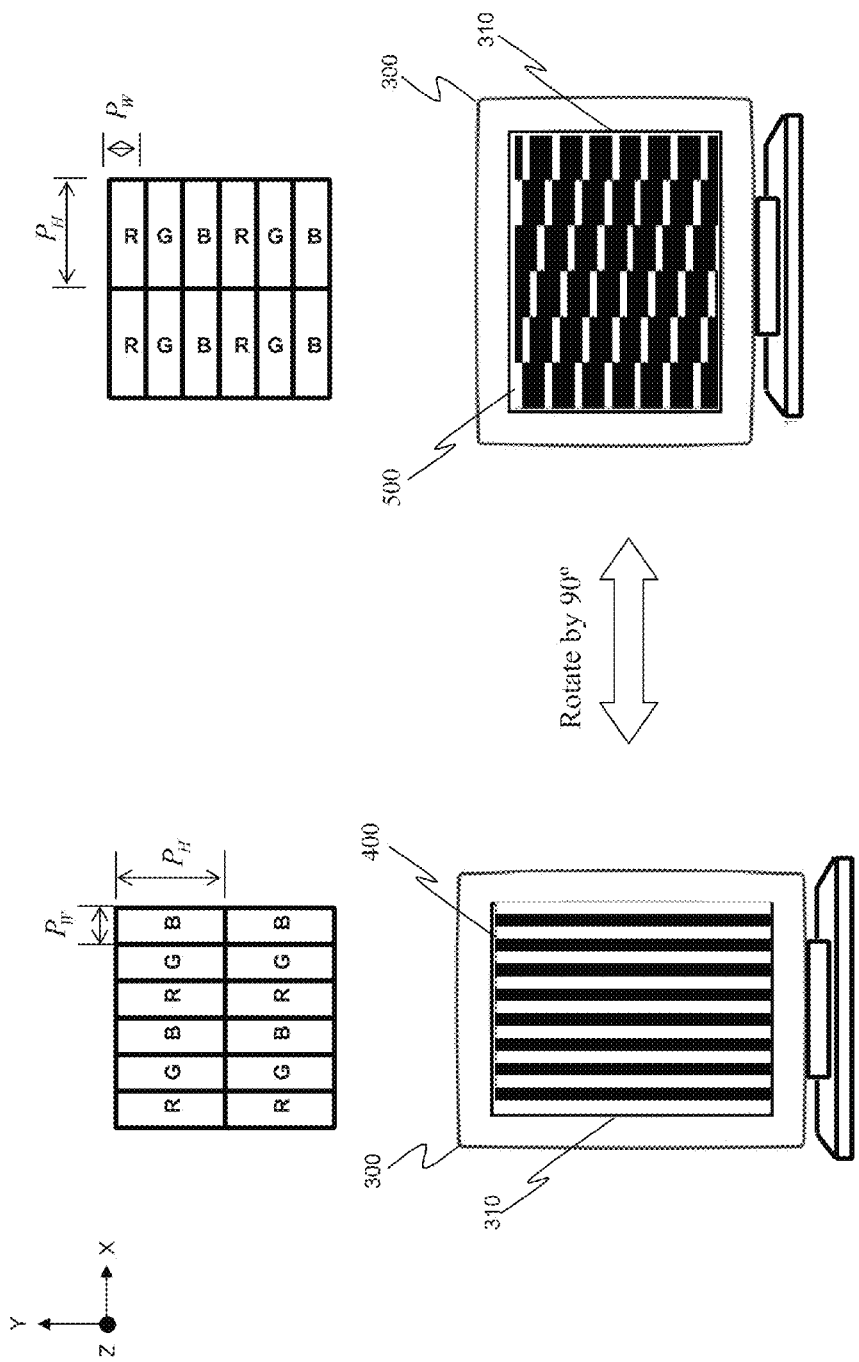

Moreover, the two parallax barriers 400 and 500 may also be installed in the manners as shown in FIG. 11 and FIG. 12. That is to say, when the flat panel display is arranged in a manner that the R, G, B sub-pixels are configured in the horizontal direction, a double-view vertical strip parallax barrier 400 is installed accordingly with a long edge of an opening of the vertical strip parallax barrier disposed in parallel to the vertical direction, and performs a view separation on the double-view 3D combined image at an optimal viewing point on an optimal viewing distance. In addition, when the flat panel display is arranged in a manner that the R, G, B sub-pixels are configured in the vertical direction, a multi-view slant-and-step parallax barrier 500 is installed accordingly with a barrier horizontal line structure of the slant-and-step parallax barrier (as defined in FIG. 21 and the following content) disposed in parallel to the horizontal direction, and performs a view separation on the multi-view 3D combined image at an optimal viewing point on an optimal viewing distance.

Regarding the installation manners of the first embodiment and the second embodiment, according to ROC Patent Application No. 099107311, a general formula may be used to calculate essential design parameters of the two parallax barriers 400 and 500, and optimization processes of the optimal viewing distance and the opening width of the light-transmissive element are carried out.

Figure 13:
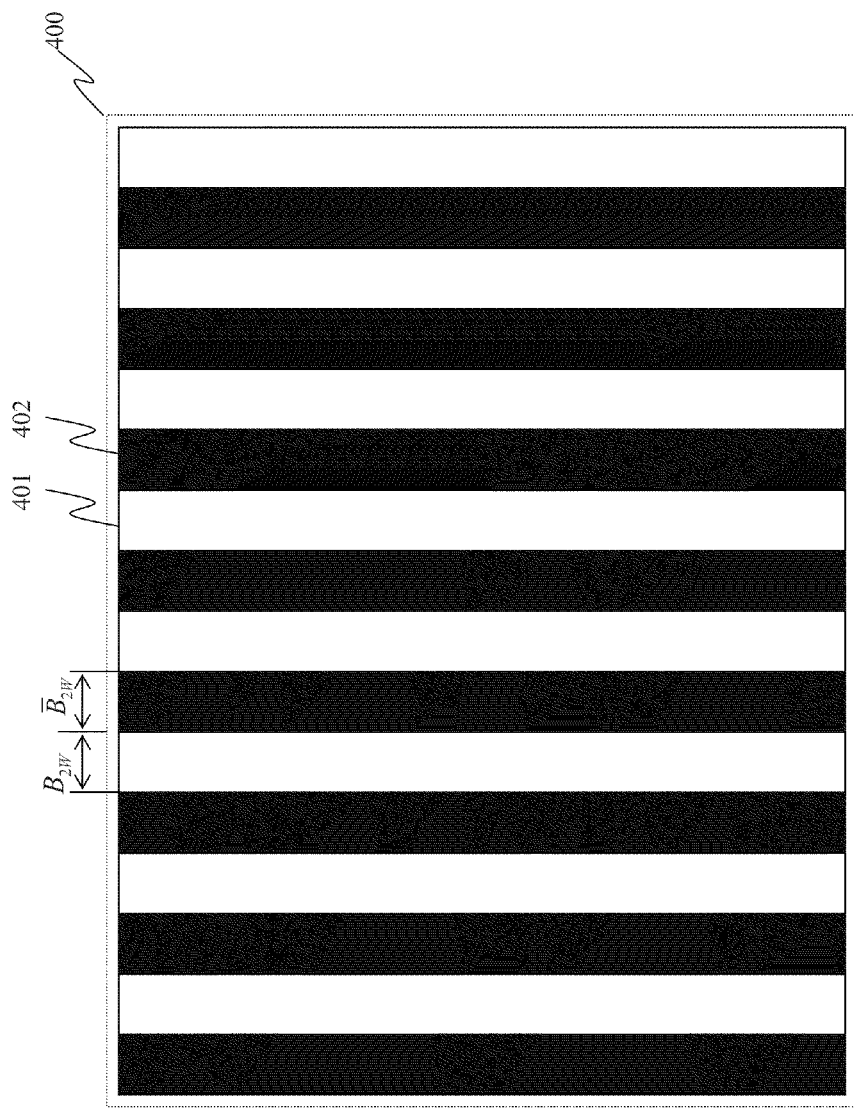
FIG. 13 is a schematic view showing a corresponding relation between the opening of the light-transmissive element and the view before optimizing the horizontal opening width of the light-transmissive element.

Regarding the design of the double-view vertical strip parallax barrier 400, as shown in FIG. 13, the double-view vertical strip parallax barrier 400 is mainly used to display a double-view 3D image, and is formed by a plurality of light-transmissive elements 401 and shielding elements 402. The light-transmissive elements 401 and the shielding elements 402 have a geometrical vertical strip structure, and respectively have a horizontal width $B_{2W}$, $\overline{B}_{2W}$. According to ROC Patent Application No. 099107311, parameters including the horizontal width $B_{2W}$ of the light-transmissive element 401, the horizontal width $\overline{B}_{2W}$ of the shielding element 402, the optimal viewing distance $Z_{20}$, an installation distance of the parallax barrier $L_B$, and an average eye interval $L_E$ having the following basic relations:

$$B_{2W} = \frac{P_{2W} L_E}{P_{2W} + L_E} \quad (2)$$

$$\overline{B}_{2W} = B_{2W} \quad (3)$$

$$Z_{20} = \frac{P_{2W}}{P_{2W} - B_{2W}} L_B \quad (4)$$

where $P_{2W}$ is a horizontal width of a smallest view image display unit of the double-view vertical strip parallax barrier 400. In the first embodiment, as shown in FIG. 9 and FIG. 10, the horizontal width $P_{2W}$ of the smallest view image display unit has the following relation:

$$P_{2W} = mP_H \quad (5)$$

where m is a positive integer. In addition, in the second embodiment, as shown in FIG. 11 and FIG. 12, the horizontal width $P_{2W}$ of the smallest view image display unit may have the following relation:

$$P_{2W} = mP_W \quad (6)$$

where m is a positive integer.

Figure 14:
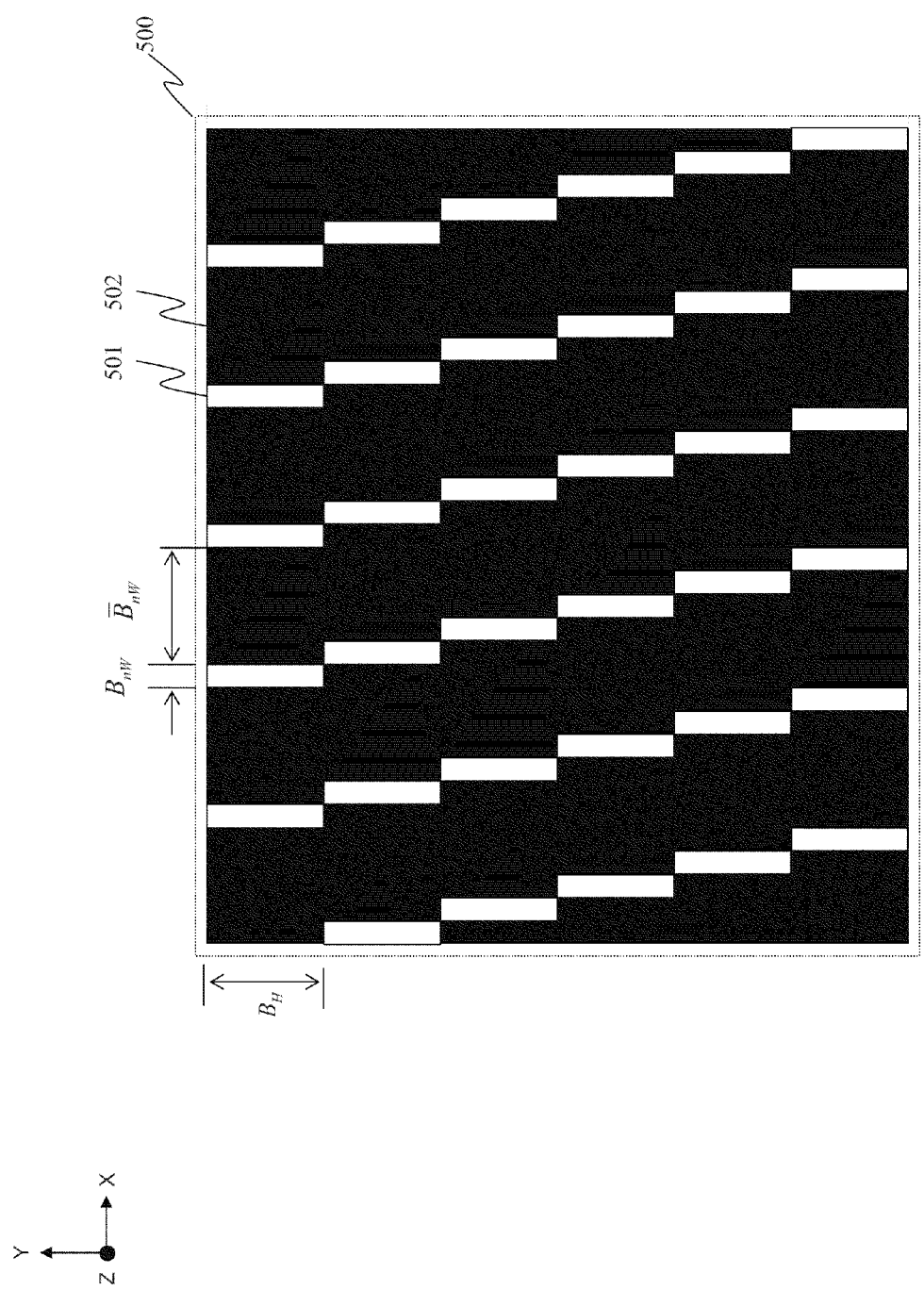

Regarding the multi-view slant-and-step parallax barrier 500, as shown in FIG. 14, the multi-view slant-and-step parallax barrier 500 is mainly used to display a multi-view 3D image, and is formed by a plurality of light-transmissive elements 501 and shielding elements 502. The light-transmissive elements 501 and the shielding elements 502 have a geometrical step structure, and respectively have a horizontal width $B_{nW}$, $\overline{B}_{nW}$, where n is a number of views and n≥2. According to ROC Patent Application No. 099107311, parameters including the horizontal width $B_{nW}$ of the light-transmissive element 501, the horizontal width $\overline{B}_{nW}$ of the shielding element 502, the optimal viewing distance $Z_{n0}$, an installation distance of the parallax barrier $L_B$, and an average eye interval $L_E$ have the following basic relations:

$$B_{nW} = \frac{P_{nW} L_E}{P_{nW} + L_E} \quad (7)$$

$$\overline{B}_{nW} = (n-1)B_{nW} \quad (8)$$

$$Z_{n0} = \frac{P_{nW}}{P_{nW} - B_{nW}} L_B \quad (9)$$

where $P_{nW}$ is a horizontal width of a smallest view image display unit of the multi-view slant-and-step parallax barrier 500. In the first embodiment, as shown in FIG. 9 and FIG. 10, the horizontal width of the smallest view image display unit may have the following relation:

$$P_{nW} = m'P_W \quad (10)$$

where m' is a positive integer. In addition, in the second embodiment, as shown in FIG. 11 and FIG. 12, the horizontal width $P_{nW}$ of the smallest view image display unit may have the following relation:

$$P_{nW} = m'P_H \quad (11)$$

where m' is a positive integer.

Further, regarding the multi-view slant-and-step parallax barrier 500, the vertical width $B_H$ of the light-transmissive element 501, in the first embodiment, may be:

$$B_H = \frac{Z_{n0} - L_B}{Z_{n0}} P_H \quad (12)$$

and, in the second embodiment, may be:

$$B_H = \frac{Z_{n0} - L_B}{Z_{n0}} P_W \quad (13)$$

1. Optimization of Viewing Distance

Let both the double-view vertical strip parallax barrier 400 and the multi-view slant-and-step parallax barrier 500 be capable of displaying the 3D image at the same optimal viewing distance, so as to achieve the convenience for viewing.

In the first embodiment, set $P_{2W}=P_{nw}$, thus according to Formulas (5) and (10) obtaining:

$$mP_H = m'P_W \quad (14)$$

and according to Formula (I), i.e., $P_H=3P_W$, obtaining:

$$m'=3m \quad (15)$$

Therefore, in the first embodiment, regarding the double-view vertical strip parallax barrier 400 and the multi-view slant-and-step parallax barrier 500, the relation in Formula (15) is an optimization condition of the optimal viewing distance. Further, in consideration of the uniform distribution of the view image, the values in Formula (15) are preferably set to m=1, m'=3. That is to say, the horizontal opening of the light-transmissive element of the double-view vertical strip parallax barrier 400 is corresponding to an image having a width of one pixel; and the horizontal opening of the light-transmissive element of the multi-view slant-and-step parallax barrier 500 is corresponding to an image having a width of three sub-pixels. In other words, the horizontal widths of the smallest view image display units corresponding to the two parallax barriers are both the width of one pixel. In addition, under the optimization condition of the optimal viewing distance and m=1, m'=3, the multi-view 3D combined image $\Sigma_n$ displayed by the multi-view slant-and-step parallax barrier 500 is expressed by the following formula:

$$\Sigma_n = \sum_{i=0}^{M-1} \sum_{j=0}^{N-1} V_\Lambda^{i,j} \quad (16)$$

when $j \geq i$, $$\Lambda = \text{Mod}\left[\frac{\text{int}\left(\frac{j-i}{3}\right)}{n}\right] \quad (17)$$

when $j < i$, $$\Lambda = \text{Mod}\left\{n - \text{Mod}\left[\frac{\text{int}\left(\frac{i-j+2}{3}\right)}{n}\right]\right\} \quad (18)$$

where n is a number of views and n≥2; $V_\Lambda^{i,j}$ is a single-view image, $\Lambda$ is an index of the single-view image and has a relation of $0 \leq \Lambda < n$, and i, j indicate a sub-pixel position of the $i^{th}$ row and a $j^{th}$ row and a column on the flat panel display screen; and int is a quotient function and Mod is a residue function. According to Formulas (16) to (18), the structure of the multi-view 3D combined image for the multi-view slant-and-step parallax barrier is illustrated as follows. FIG. 15 shows a schematic view of structure of a four-view 3D combined image when n=4, and FIG. 16 is a schematic view of a five-view 3D combined image when n=5, where the numbers 0 to 4 represent an index of each single-view image, and i, j indicate an image of the single-view 0 to 4 at the sub-pixel position of the $i^{th}$ row and $j^{th}$ column on the flat panel display screen.

Moreover, in consideration of the current popular 3D applications in the market (with the double-view as a majority), the number of views n of the multi-view slant-and-step parallax barrier 500 may be set to n=2. That is to say, when the slant-and-step parallax barrier 500 is designed to be a double-view slant-and-step parallax barrier, the two parallax barriers 400 and 500 have the same parameters including the horizontal width $B_{W0}$ of the light-transmissive element, the horizontal width $\overline{B}_{W0}$ of the shielding element, the optimal viewing distance $Z_0$, an installation distance of the parallax barrier $L_B$, and an average eye interval $L_E$, which are expressed by the following formulas:

$$B_{W0} = \frac{P_H L_E}{P_H + L_E} \quad (19)$$

$$\overline{B}_{W0} = B_{W0} \quad (20)$$

$$Z_0 = \frac{P_H}{P_H - B_{W0}} L_B \quad (21)$$

The vertical width $B_{H0}$ of the light-transmissive element of the double-view slant-and-step parallax barrier is:

$$B_{H0} = \frac{Z_0 - L_B}{Z_0} P_H \quad (22)$$

In addition, regarding the optimization condition of the optimal viewing distance according to the second embodiment, set $P_{2W} = P_{nW}$, thus according to Formulas (6) and (11) obtaining:

$$mP_W = m'P_H \quad (23)$$

and according to Formula (1), i.e., $P_H = 3P_W$, obtaining:

$$m = 3m' \quad (24)$$

Therefore, in the second embodiment, regarding the double-view vertical strip parallax barrier 400 and the multi-view slant-and-step parallax barrier 500, the relation in Formula (24) is an optimization condition of the viewing distance. Further, in consideration of the uniform distribution of the view image, the values in Formula (24) are preferably set to m'=1, m=3. That is to say, the horizontal opening of the light-transmissive element of the double-view vertical strip parallax barrier 400 is corresponding to an image having a width of three sub-pixels; and the horizontal opening of the multi-view slant-and-step parallax barrier 500 is corresponding to an image having a width of one pixel. In other words, the horizontal widths of the smallest view image display units corresponding to the two parallax barriers are both the width of one R, G, B pixel. Moreover, the number of views n of the multi-view slant-and-step parallax barrier 500 may be set to n=2. That is to say, when the slant-and-step parallax barrier 500 is designed to be a double-view slant-and-step parallax barrier, the two parallax barriers 400 and 500 have the same parameters including the horizontal width $B_{W0}$ of the light-transmissive element, the horizontal width $\overline{B}_{W0}$ of the shielding element, and the optimal viewing distance $Z_0$, which are expressed by Formulas (19) to (21). The vertical width $B_{H0}$ of the light-transmissive element of the double-view slant-and-step parallax barrier is:

$$B_{H0} = \frac{Z_0 - L_B}{Z_0} P_W \quad (25)$$

2. Color Deviation

Figure 17:
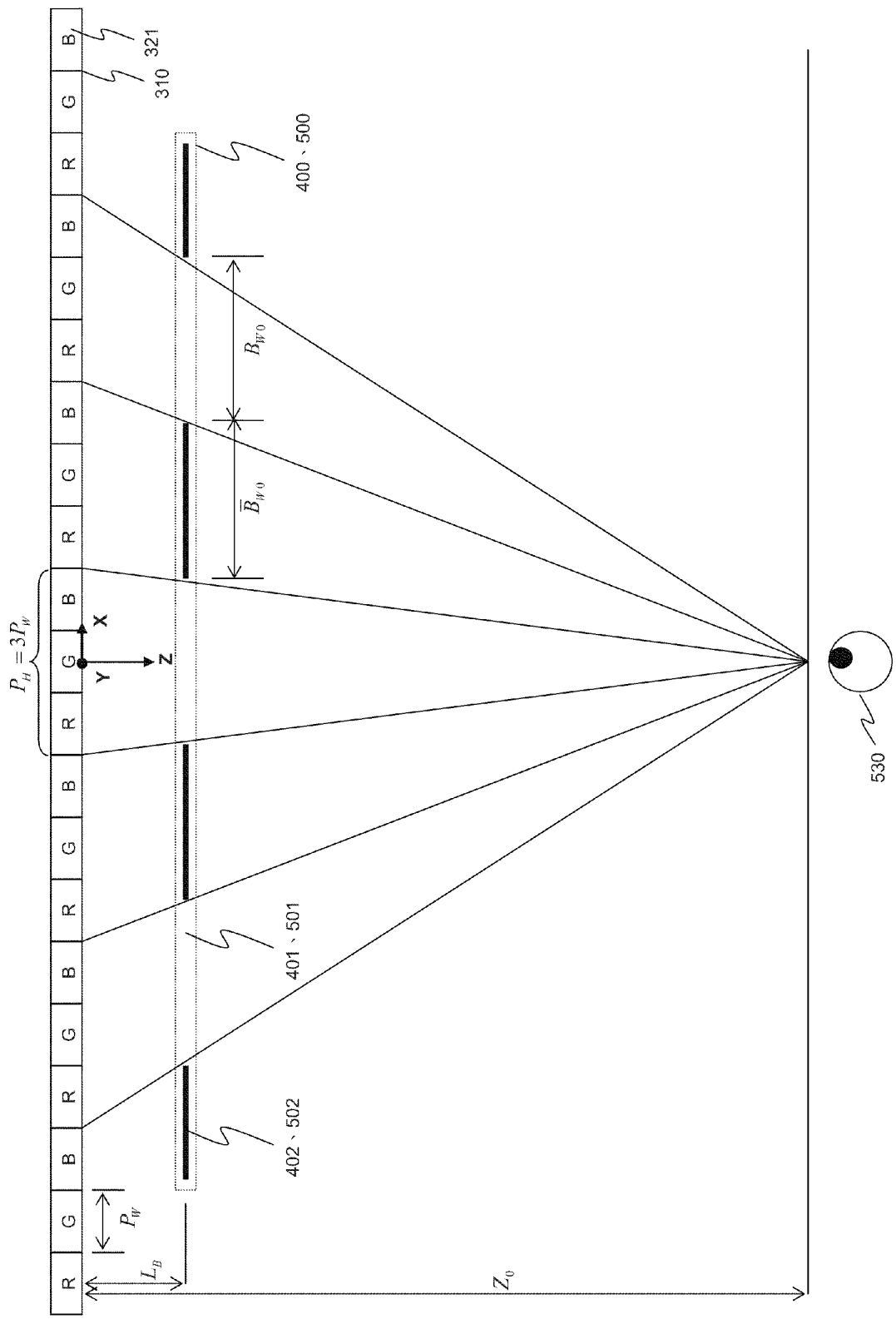
FIG. 17 is a schematic view showing a corresponding relation between the opening of the light-transmissive element and the view without an optimization process.

Referring to the left figures in FIG. 9 to FIG. 12, no matter for the double-view vertical strip parallax barrier 400 or the multi-view slant-and-step parallax barrier 500, as shown in FIG. 17, when the opening of the light-transmissive element (the horizontal opening width of the light-transmissive element is not optimized) is corresponding to three R, G, B sub-pixels, i.e., the horizontal width of the smallest view image display unit is the width of one pixel, color deviation may easily occur. Hereinafter, for ease of illustration, the two parallax barriers 400 and 500 are both adapted for the double-view display as an example to describe the color deviation and provide a solution thereof.

Figure 18:
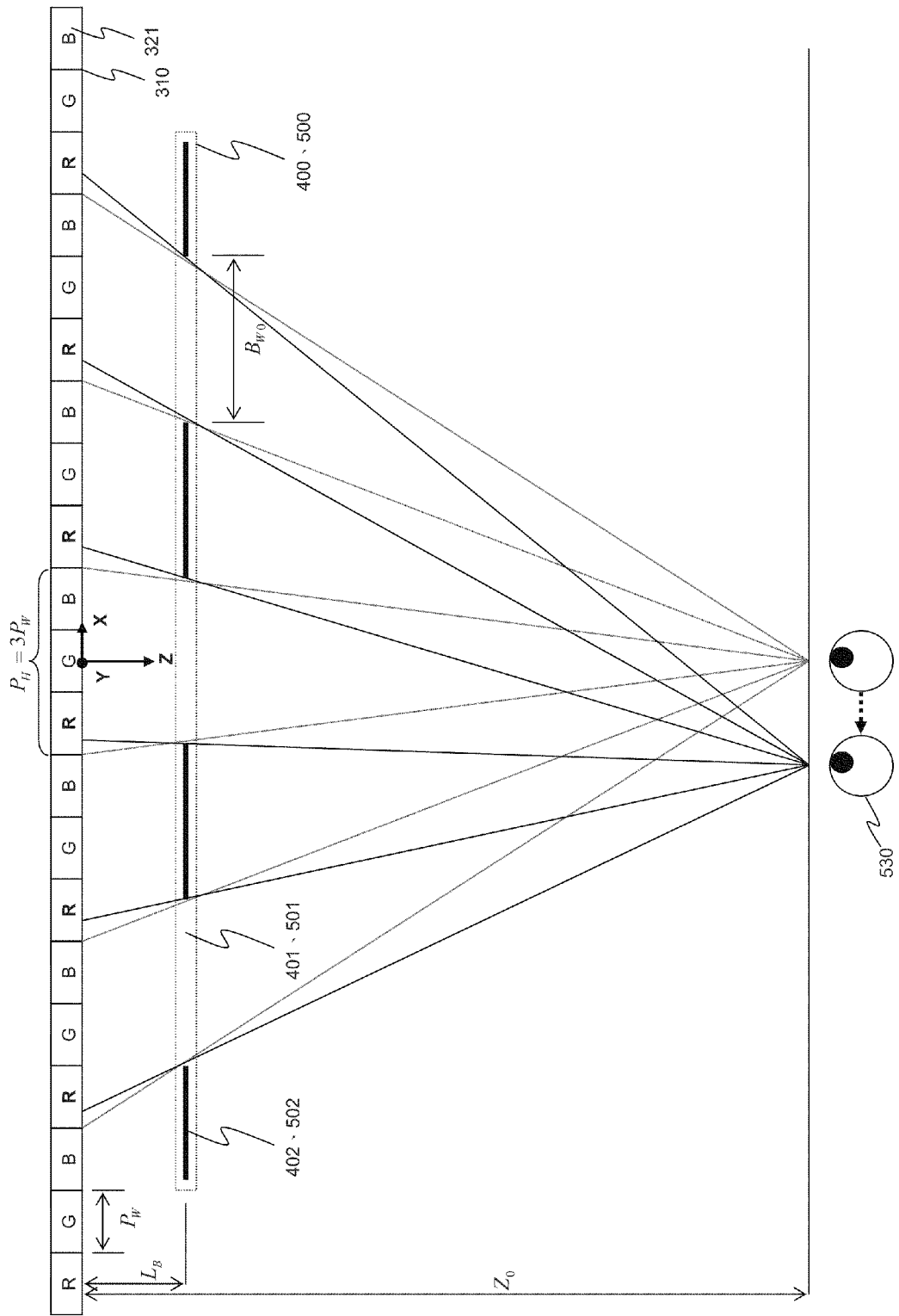
FIG. 18 and FIG. 19 are schematic views of motion-caused color deviation when a horizontal opening width of the light-transmissive element is not optimized.
Figure 19:
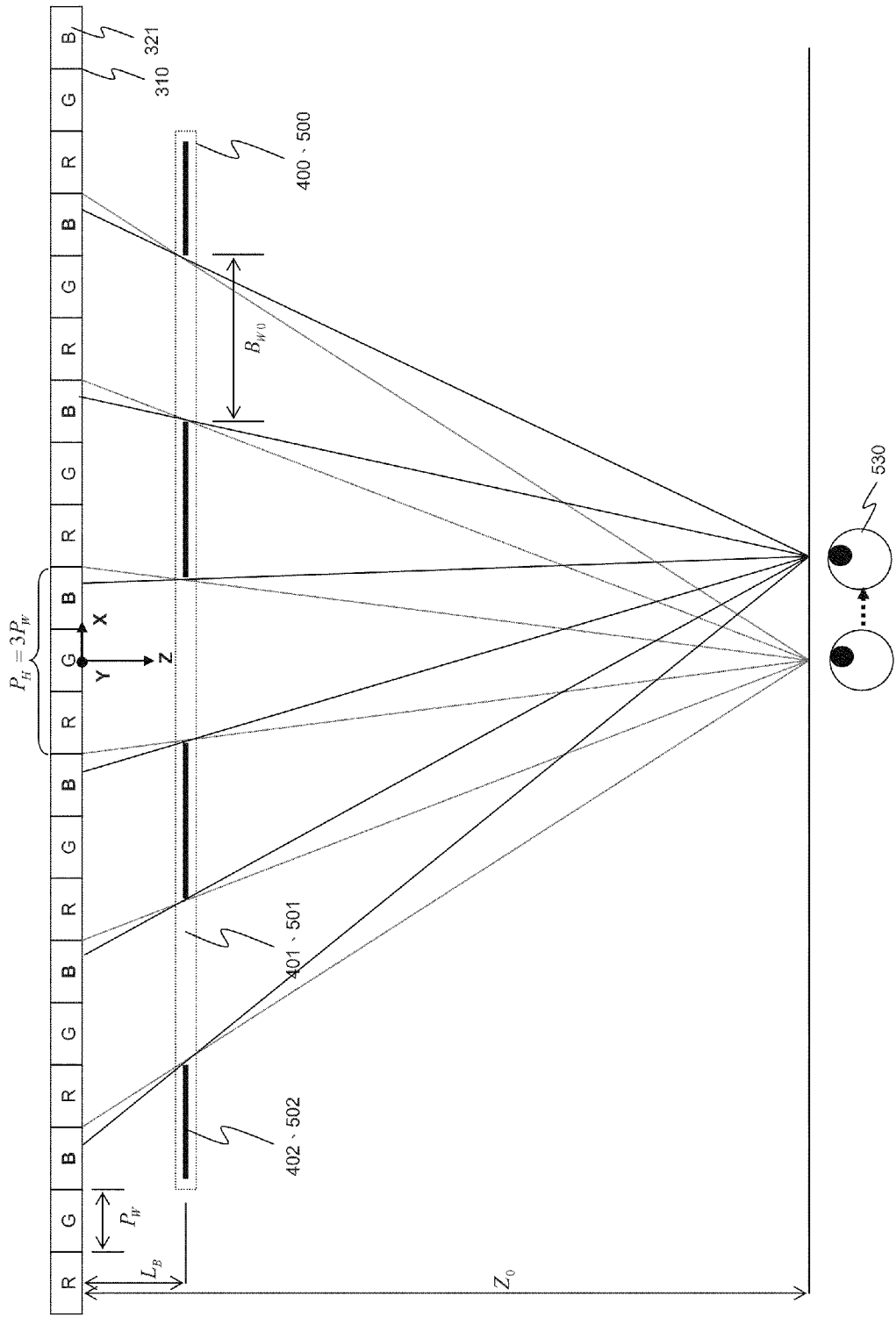

FIG. 18 and FIG. 19 are schematic views of motion-caused color deviation when the horizontal opening width of the light-transmissive element is not optimized. When eyes 530 of the viewer move horizontally from the optimal viewing point (for example, the head of the viewer shakes horizontally), due to the change of the viewing angle, adjacent view images (i.e., ghost images) may be easily seen, and when moving leftwards, the color turns slightly red; while when moving rightwards, the color turns slightly blue.

Figure 20:
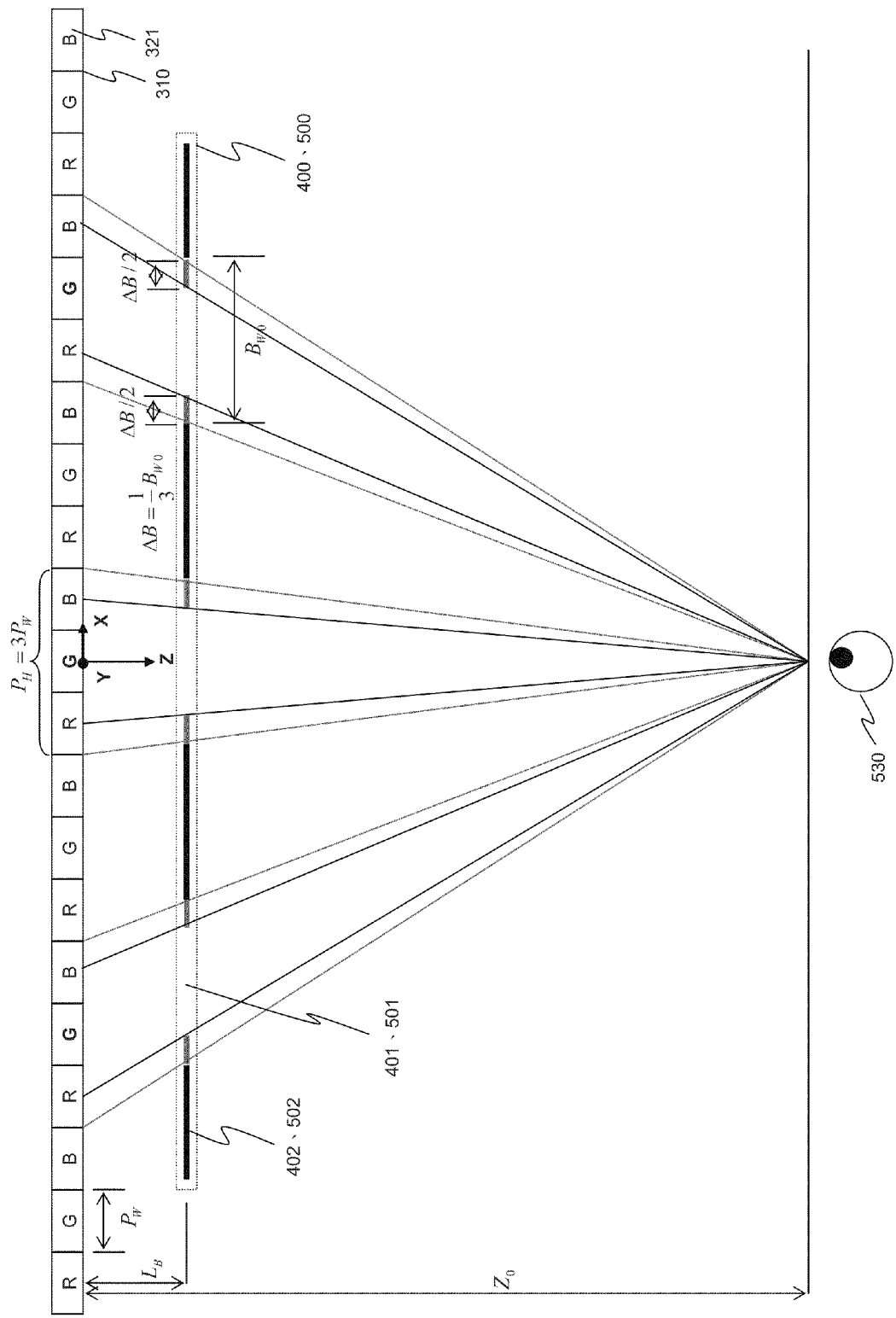
FIG. 20 and FIG. 21 are schematic views of color distributed deviation after the horizontal opening width of the light-transmissive element is optimized.
Figure 21:
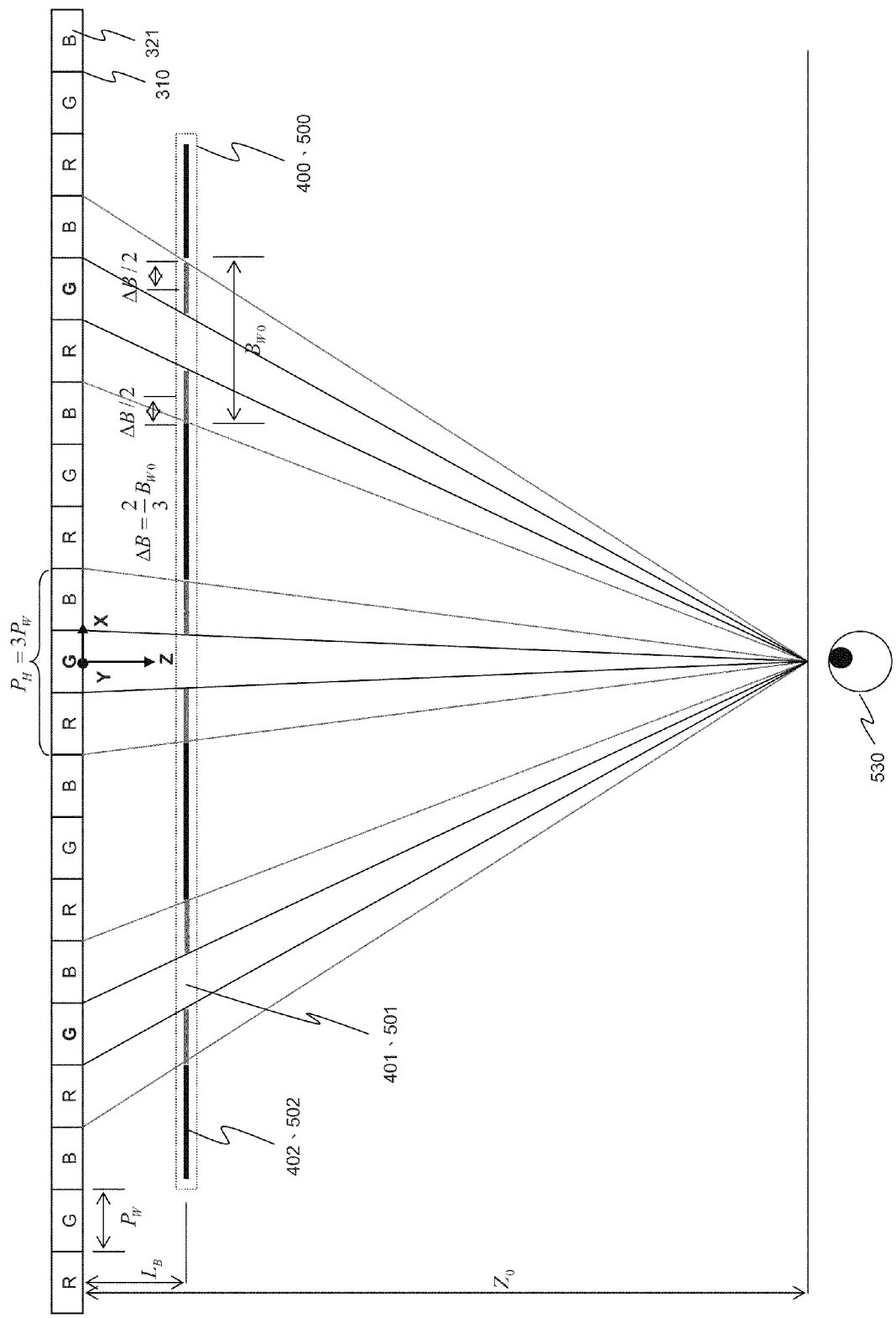

FIG. 20 and FIG. 21 are schematic views of distributed color deviation after the horizontal opening width of the light-transmissive element is optimized. Although the horizontal opening width of the light-transmissive element is optimized, that is, the horizontal opening width is reduced by an amount of $\Delta B$ to increase the horizontal viewing range, as shown in FIG. 20 and FIG. 21, regardless of the specific value of the reducing amount $\Delta B$ of the opening (e.g., $\Delta B = B_{W0}/3$ or $\Delta B = 2B_{W0}/3$), the whole view image may easily have non-uniform color distribution. If the viewing position moves, the motion-caused color deviation also occurs (not shown).

After the vertical strip parallax barrier 400 of the second embodiment, as described above, is subjected to the optimization process of the optimal viewing distance, the opening of the light-transmissive element is corresponding to three R, G, B sub-pixels, and the color deviation problem cannot be solved due to its vertical strip structure. Therefore, the second embodiment cannot satisfy the optimization requirement of the optimal viewing distance. The slant-and-step parallax barrier 500 of the first embodiment is different from the conventional slant-and-step parallax barrier (i.e., the sub-pixel unit is taken as the smallest view image display unit to display the 3D image), and according to the structure of the slant-and-step parallax barrier of the present invention, the opening of the light-transmissive element is corresponding to three R, G, B sub-pixels, that is to say, the pixel unit is taken as the smallest view image display unit to display the 3D image. The method of properly horizontally displacing adjacent vertical light-transmissive elements and properly reducing the opening width of the light-transmissive element can solve the color deviation problem and meanwhile increase the horizontal and vertical viewing ranges.

Figure 22:
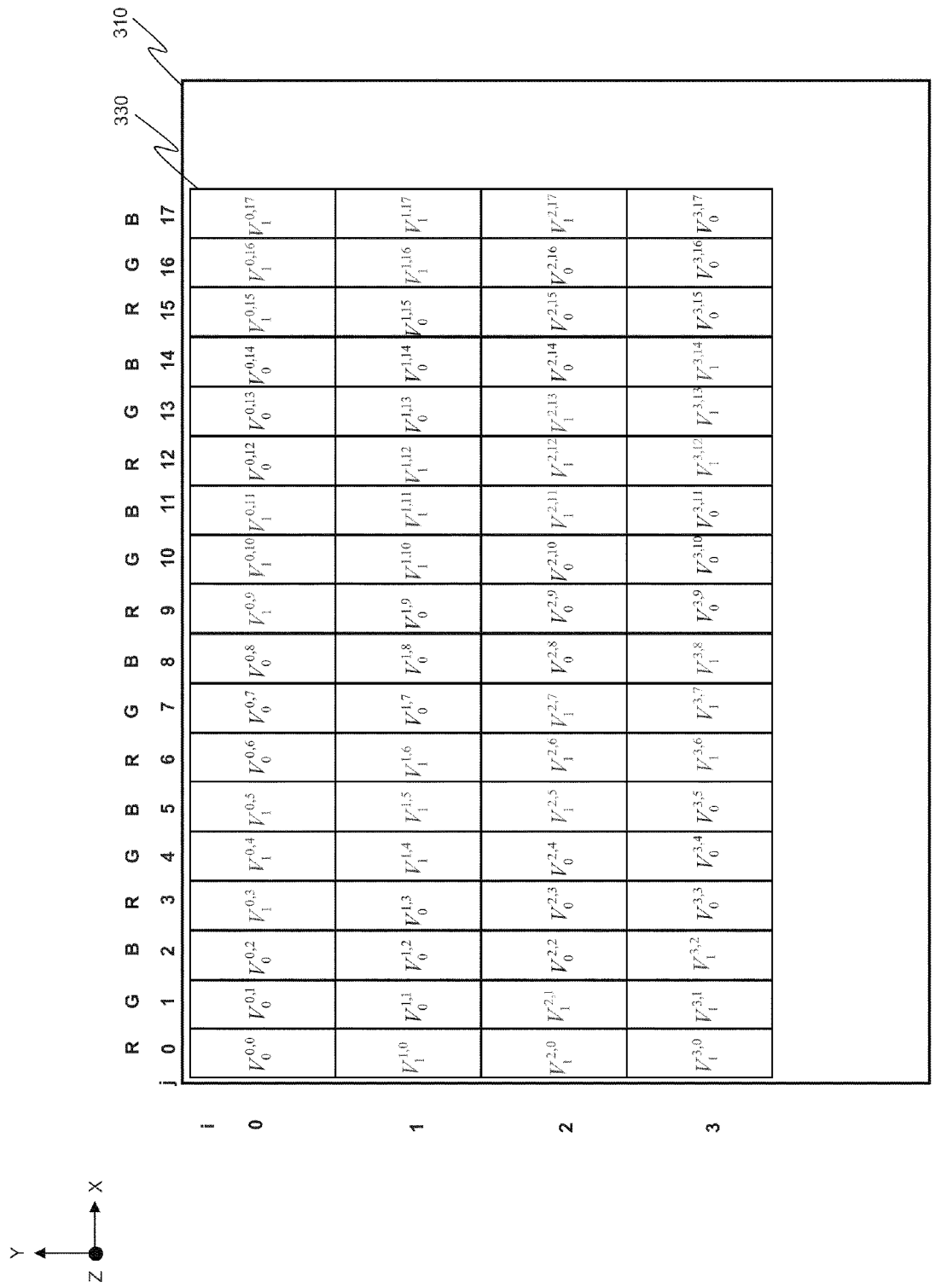
FIG. 22 is a schematic view of a double-view 3D combined image for a double-view slant-and-step parallax barrier.

3. Combination of Double-View 3D Image and Structure of Double-View Slant-and-Step Parallax Barrier FIG. 22 is a schematic view of a double-view 3D combined image corresponding to the double-view slant-and-step parallax barrier 500. The double-view 3D combined image 330 is formed by two single-view images $V_0$, $V_1$ ($V_0$, $V_1$ may represent a left image and a right image respectively; or vice versa), and the $V_0$, $V_1$ may be expressed by the following formula:

$$V_k = \sum_{i=0}^{M-1} \sum_{j=0}^{N-1} V_k^{i,j} \quad (26)$$

where k is an index of the single-view image; and $V_k^{i,j}$ is a sub-pixel image at a position of an $i^{th}$ row and a $j^{th}$ column on the flat panel display screen 310. As described above, the flat panel display screen 310 is formed by M×N R, G, B sub-pixels and the R, G, B sub-pixels are configured in the horizontal direction. In addition, the double-view 3D combined image 330, according to Formulas (16) to (18), may be expressed by the following formula:

$$\Sigma_2 = \sum_{i=0}^{M-1} \sum_{j=0}^{N-1} V_\Lambda^{i,j} \quad (27)$$

when $j \geq i$, $$\Lambda = \text{Mod}\left[\frac{\text{int}\left(\frac{j-i}{3}\right)}{2}\right] \quad (28)$$

when $j < i$, $$\Lambda = \text{Mod}\left\{2 - \text{Mod}\left[\frac{\text{int}\left(\frac{i-j+2}{3}\right)}{2}\right]\right\} \quad (29)$$

Figure 23:
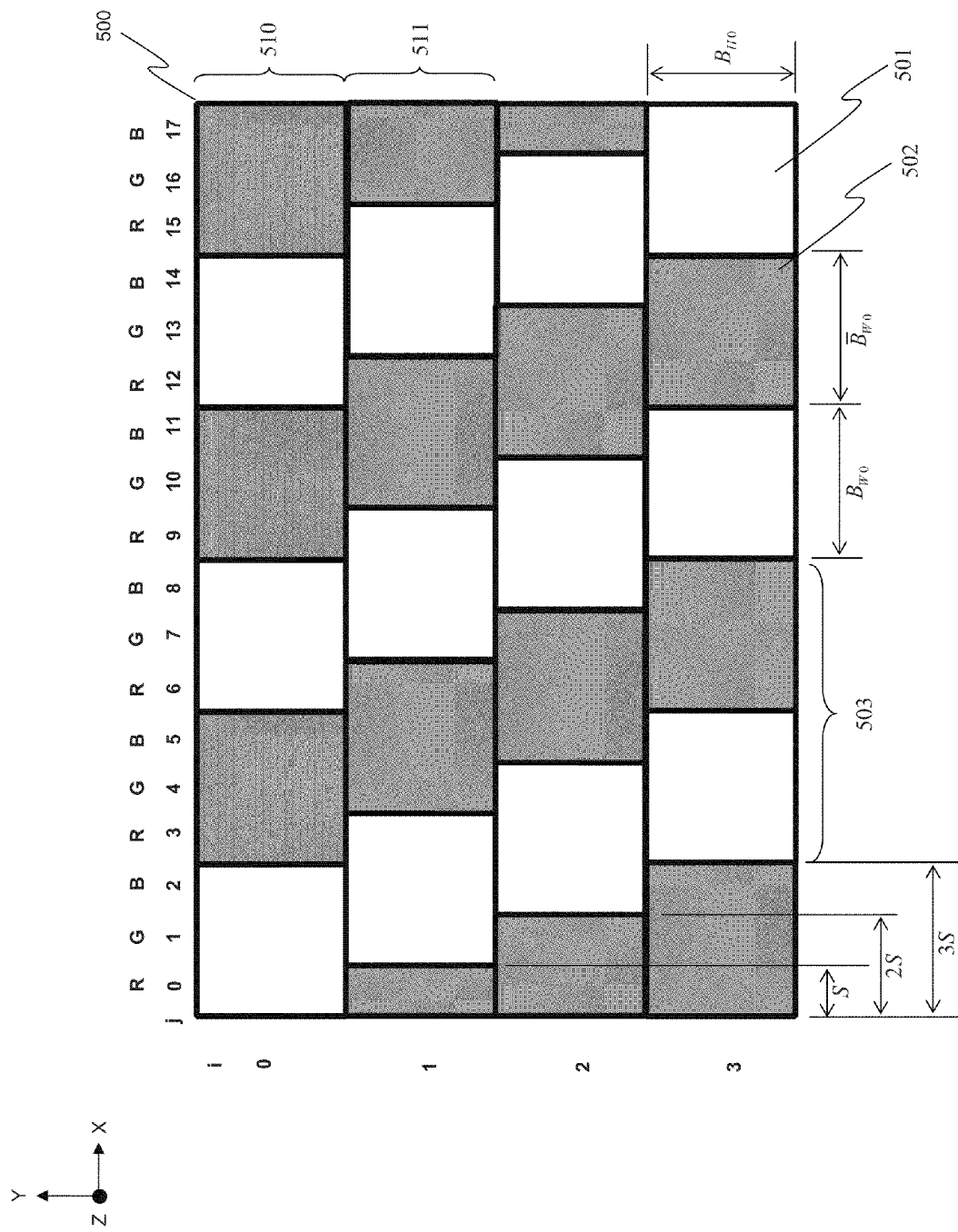
FIG. 23 is a schematic view of structure of a double-view slant-and-step parallax barrier without an optimization process.
Figure 24:
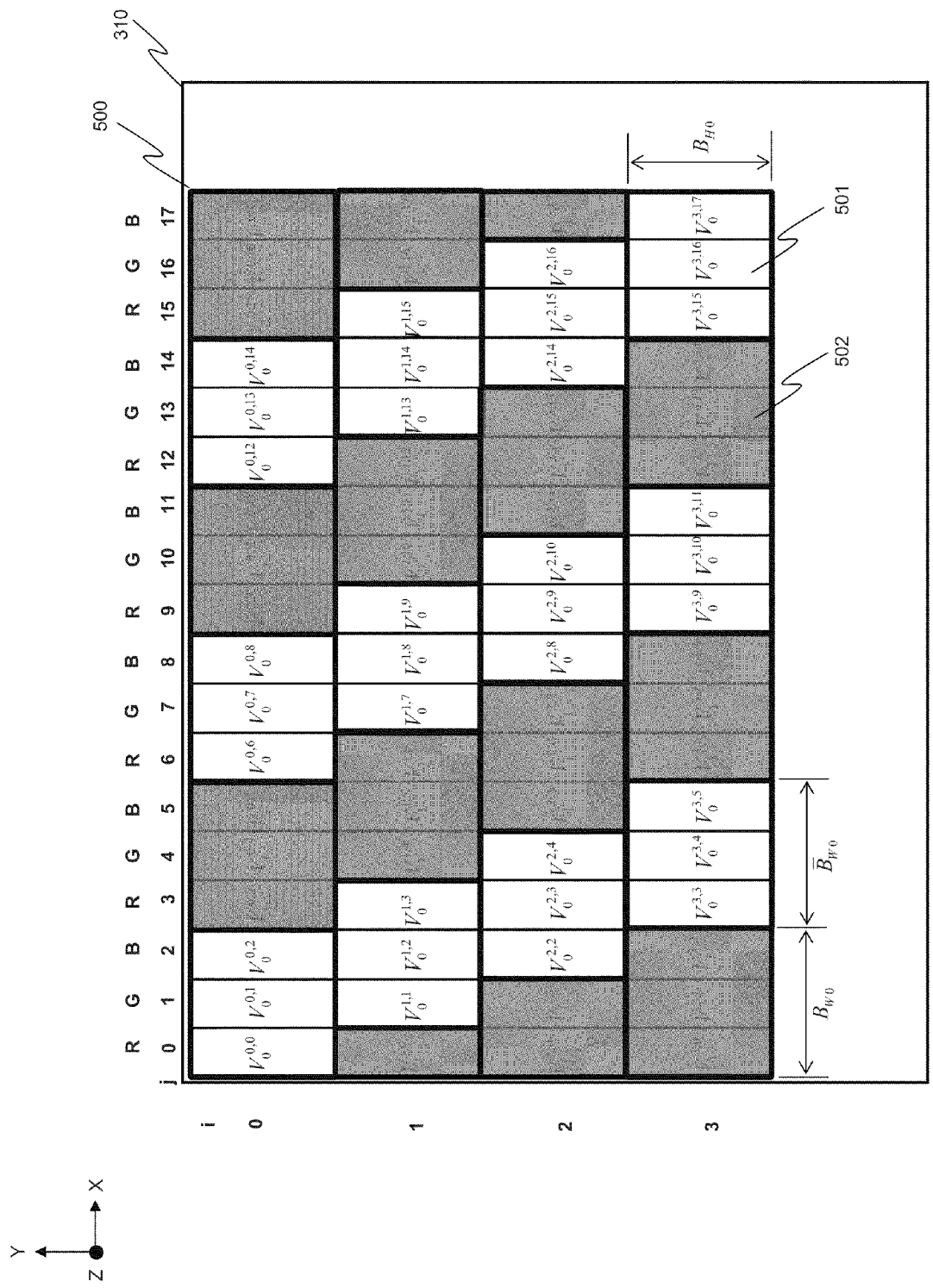
FIG. 24 is a schematic view showing a corresponding relation between the opening of the light-transmissive element of the double-view slant-and-step parallax barrier and the view without an optimization process.

FIG. 23 is a schematic view of structure of the double-view slant-and-step parallax barrier without an optimization process. As described above, in the double-view slant-and-step parallax barrier 500, one light-transmissive element 501 and one shielding element 502 form a basic barrier structure 503. The light-transmissive element 501 and the shielding element 502 have a geometrical step structure, and respectively have a horizontal width $B_{W0}$, $\overline{B}_{W0}$. A plurality of the basic barrier structures 503 is firstly repetitively configured in the horizontal direction to form a barrier horizontal line structure 510. A plurality of the barrier horizontal line structures 510 is repetitively configured in the vertical direction to form the double-view slant-and-step parallax barrier 500. For all the barrier horizontal line structures 510 that form the double-view slant-and-step parallax barrier 500, in the vertical direction, the arrangement positions of any two adjacent barrier horizontal line structures 510 and 511 in the horizontal direction are shifted rightwards for a displacement S, which satisfies a relation of $S=P_W$. Definitely, if a left-right image configuration position interchange process is performed on the double-view 3D combined image defined in the above Formulas (27) to (29), the arrangement positions of the any two adjacent barrier horizontal line structures 510 and 511 in the horizontal direction may be shifted leftwards for a displacement S (not shown). Therefore, the double-view slant-and-step parallax barrier 500 is properly installed on the flat panel display screen 310, as shown in FIG. 24, so that each light-transmissive element 501 is correctly corresponding to the image $V_0$ formed by one group of three R, G, B sub-pixels.

Figure 25:
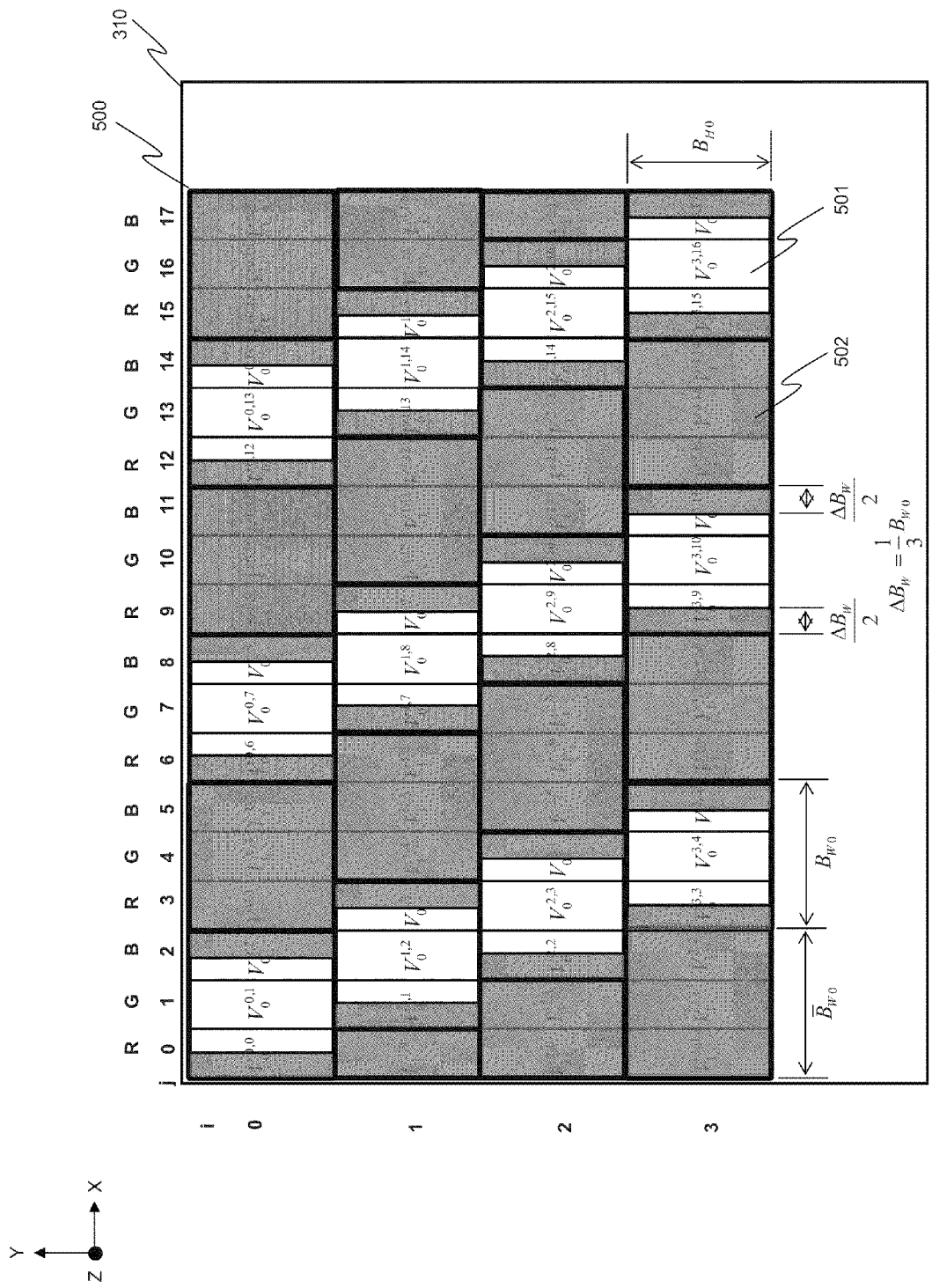
FIG. 25 and FIG. 26 are schematic views showing a corresponding relation between the opening of the light-transmissive element of the double-view slant-and-step parallax barrier and the view after a horizontal opening width of the light-transmissive element is optimized.
Figure 26:
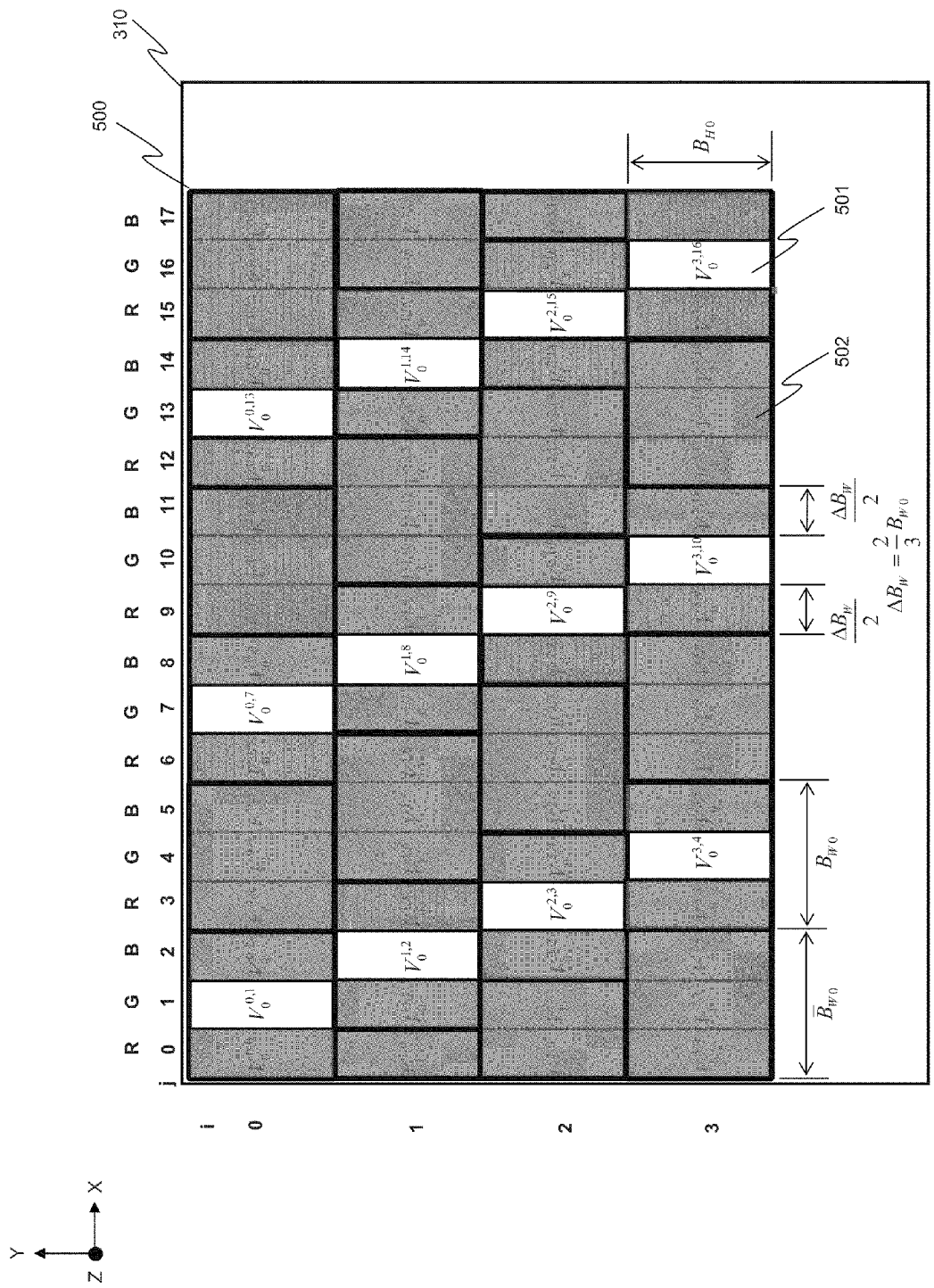

4. Solution of Color Deviation and Optimization of Opening Width of Light-Transmissive Element FIG. 25 and FIG. 26 are schematic views showing a corresponding relation between the opening of the light-transmissive element and the view after the horizontal opening width of the light-transmissive element is optimized. As shown in FIG. 25, the horizontal opening width of the light-transmissive element is reduced by an amount of $\Delta B_W = B_{W0}/3$.

Thus, the opening of each light-transmissive element is corresponding to ⅔ of one pixel. In the vertical direction, the opening of three adjacent vertical light-transmissive elements has a relation of one sub-pixel width displacement. In this case, regardless of the horizontal position of the viewing point of the viewer, under the condition of not viewing the adjacent view images, the opening of the three adjacent vertical light-transmissive elements is corresponding to an image with two entire pixels. Therefore, the color deviation problem is solved.

As shown in FIG. 26, the horizontal opening width of the light-transmissive element is reduced by an amount of $\Delta B_W = 2B_{W0}/3$. Thus, the opening of each light-transmissive element is corresponding to ⅓ of one pixel. In the vertical direction, the opening of three adjacent vertical light-transmissive elements has a relation of one sub-pixel width displacement. In this case, regardless of the horizontal position of the viewing point of the viewer, under the condition of not viewing the adjacent view images, the opening of the three adjacent vertical light-transmissive elements is corresponding to an image with one entire pixel. Therefore, the color deviation problem is solved.

Figure 27:
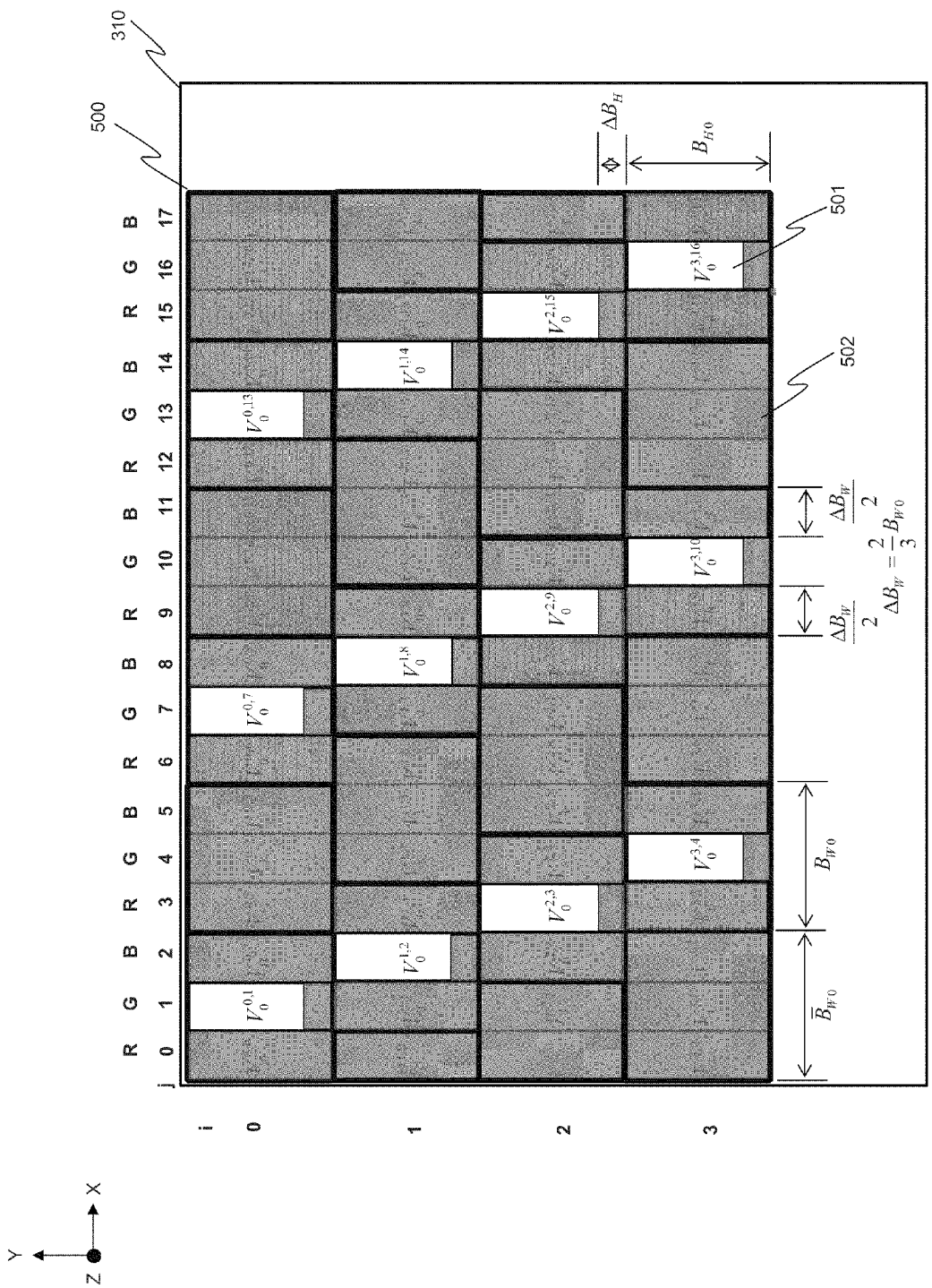
FIG. 27 is a schematic view showing a corresponding relation between the opening of the light-transmissive element of a double-view slant-and-step parallax barrier and the view after a vertical opening width of the light-transmissive element is optimized.

In addition, as described in ROC Patent Application No. 099107311, the horizontal opening width of the light-transmissive element is reduced to increase the horizontal viewing range. Likewise, as shown in FIG. 27, the vertical opening width of the light-transmissive element is properly reduced (i.e., reduced by an amount of $\Delta B_H$) to achieve the purpose of increasing the vertical viewing range. No matter in the horizontal direction or the vertical direction, though the opening width of the light-transmissive element can be properly reduced to achieve the purpose of increasing the viewing range, the brightness of the image is relatively lowered.

In view of the above, the multi-functional liquid crystal parallax barrier device of the present invention is a liquid crystal device mainly formed by two parallax barrier structures, namely, the double-view vertical strip parallax barrier and the multi-view slant-and-step parallax barrier. As described in the first embodiment and the second embodiment, and according to the configuration direction of the R, G, B sub-pixels, the two parallax barriers are respectively disposed corresponding to different screen display directions, so as to display a double-view 3D image and a multi-view 3D image in different display directions, in addition to displaying a 2D image, through the control of an appropriate driving voltage and the use of a flat panel display screen. Further, without causing the color deviation problem, the two parallax barriers formed in the first embodiment may be subjected to the optimization process of the viewing distance, and meanwhile achieve the purpose of increasing the horizontal and vertical viewing ranges.

What is claimed is:

1. A multi-functional liquid crystal parallax barrier device, being a liquid crystal device comprising an upper linear polarizer, an upper transparent substrate, an upper common electrode layer, an upper insulation layer, an upper barrier electrode layer, an upper alignment layer, a liquid crystal molecular layer, a lower alignment layer, a lower barrier electrode layer, a lower insulation layer, a lower common electrode layer, a lower transparent substrate, and a lower linear polarizer;

wherein a double-view vertical strip parallax barrier is disposed on the liquid crystal device when a display in the liquid crystal device is oriented in a first direction and a multi-view slant-and-step parallax barrier is disposed on the liquid crystal device when the display is oriented in a second direction, so as to display a double-view 3D image in the first direction and a multi-view 3D image in the second direction, in addition to displaying a 2D image, through the control of an appropriate driving voltage; or wherein the multi-view slant-and-step parallax barrier is disposed on the liquid crystal device when the display is oriented in the first direction and the double-view vertical strip parallax barrier is disposed on the liquid crystal device when the display is oriented in the second direction, so as to display the multi-view 3D image in the first direction and the double-view 3D image in the second direction, in addition to displaying the 2D image, through the control of the appropriate driving voltage.

2. The multi-functional liquid crystal parallax barrier device according to claim 1, wherein the electrode structures on the upper and lower barrier electrode layers are respectively installed with the double-view vertical strip parallax barrier and the multi-view slant-and-step parallax barrier in different display directions.

3. The multi-functional liquid crystal parallax barrier device according to claim 2, wherein regarding the installation direction of the double-view vertical strip parallax barrier, when the flat panel display is arranged in a manner that the R, G, B sub-pixels are configured in the vertical direction, the double-view vertical strip parallax barrier is installed accordingly with a long edge of an opening of the double-view vertical strip parallax barrier disposed in parallel to the vertical direction, and the double-view vertical strip parallax barrier performs a view separation on the double-view 3D combined image at an optimal viewing point on an optimal viewing distance in the horizontal direction, so as to display the double-view 3D image; while when the flat panel display is arranged in a manner that the R, G, B sub-pixels are conFigured in the horizontal direction, a multi-view slant-and-step parallax barrier is installed accordingly with a barrier horizontal line structure of the multi-view slant-and-step parallax barrier disposed in parallel to the horizontal direction, and the multi-view slant-and-step parallax barrier performs a view separation on the multi-view 3D combined image at an optimal viewing point on an optimal viewing distance in the horizontal direction, so as to display the multi-view 3D image.

4. The multi-functional liquid crystal parallax barrier device according to claim 3, wherein the double-view vertical strip parallax barrier is formed by a plurality of light-transmissive elements and shielding elements, the light-transmissive elements and the shielding elements have a geometrical vertical strip structure and respectively have a horizontal width $B_{2W}$, $\overline{B}_{2W}$, and parameters comprising the horizontal width $B_{2W}$ of the light-transmissive element, the horizontal width $\overline{B}_{2W}$ of the shielding element, the optimal viewing distance $Z_{20}$, an installation distance of the parallax barrier $L_B$, and an average eye interval $L_E$ have the following basic relations:

$$B_{2W} = \frac{P_{2W} L_E}{P_{2W} + L_E}$$

$$\overline{B}_{2W} = B_{2W}$$

$$Z_{20} = \frac{P_{2W}}{P_{2W} - B_{2W}} L_B$$

where $P_{2W}$ is a horizontal width of a smallest view image display unit corresponding to the double-view vertical strip parallax barrier and has the following relation:

$$P_{2W} = mP_H$$

where m is a positive integer; the multi-view slant-and-step parallax barrier is formed by a plurality of light-transmissive elements and shielding elements, the light-transmissive elements and the shielding elements have a geometrical step structure and respectively have a horizontal width $B_{nW}$, $\overline{B}_{nW}$, where n is a number of views and n≥2, and parameters comprising the horizontal width $B_{nW}$ of the light-transmissive element, the horizontal width $\overline{B}_{nW}$ of the shielding element, the optimal viewing distance $Z_{n0}$, an installation distance of the parallax barrier $L_B$, and an average eye interval $L_E$ have the following basic relations:

$$B_{nW} = \frac{P_{nW} L_E}{P_{nW} + L_E}$$

$$\overline{B}_{nW} = (n-1) B_{nW}$$

$$Z_{n0} = \frac{P_{nW}}{P_{nW} - B_{nW}} L_B$$

where $P_{nW}$ is a horizontal width of a smallest view image display unit corresponding to the multi-view slant-and-step parallax barrier and has the following relation:

$$P_{nW} = m'P_W$$

where m' is a positive integer, and a vertical width $B_H$ of the light-transmissive element of the multi-view slant-and-step parallax barrier is:

$$B_H = \frac{Z_{n0} - L_B}{Z_{n0}} P_H.$$

5. The multi-functional liquid crystal parallax barrier device according to claim 4, wherein the double-view vertical strip parallax barrier and the multi-view slant-and-step parallax barrier are subjected to an optimization process of the optimal viewing distance, and an optimization condition of the optimal viewing distance comprises setting the horizontal widths $P_{2W}$ and $P_{nW}$ to have the same value, i.e., $P_{2W}=P_{nW}$, to obtain a relation of m'=3m, so that the two parallax barriers have the same optimal viewing distance.

6. The multi-functional liquid crystal parallax barrier device according to claim 5, wherein the optimization condition of the optimal viewing distance comprises preferably setting m=1, m' =3 based on the relation of m' =3m, the horizontal opening of the light-transmissive element of the double-view vertical strip parallax barrier is corresponding to an image having a width of one pixel; while the horizontal opening of the light-transmissive element of the multi-view slant-and-step parallax barrier is corresponding to an image having a width of three sub-pixels, and the horizontal widths of the smallest view image display units corresponding to the two parallax barriers are both the width of one pixel.

7. The multi-functional liquid crystal parallax barrier device according to claim 5 and 6, wherein under the optimization condition of the optimal viewing distance and m=1, m'=3, when the number of views n of the multi-view slant-and-step parallax barrier is set to n=2, and the slant-and-step parallax barrier is a double-view slant-and-step parallax barrier, the double-view vertical strip parallax barrier and the double-view slant-and-step parallax barrier have the same horizontal width of the light-transmissive element $B_{W0}$, the same horizontal width of the shielding element $\overline{B}_{W0}$, the same optimal viewing distance $Z_0$, and satisfy the following relations:

$$B_{W0} = \frac{P_H L_E}{P_H + L_E}$$

$$\overline{B}_{W0} = B_{W0}$$

$$Z_0 = \frac{P_H}{P_H - B_{W0}} L_B$$

and the vertical width of the light-transmissive element $B_{H0}$ of the double-view slant-and-step parallax barrier is:

$$B_{H0} = \frac{Z_0 - L_B}{Z_0} P_H.$$

8. The multi-functional liquid crystal parallax barrier device according to claim 7, wherein regarding the structure of the double-view slant-and-step parallax barrier, one light-transmissive element and one shielding element form a basic barrier structure; then, a plurality of the basic barrier structures is repetitively conFigured in the horizontal direction to form a barrier horizontal line structure; afterward, a plurality of the barrier horizontal line structures is repetitively conFigured in the vertical direction to form the double-view slant-and-step parallax barrier; and for all the barrier horizontal line structures that form the double-view slant-and-step parallax barrier, in the vertical direction, the arrangement positions of any two adjacent barrier horizontal line structures in the horizontal direction are shifted for a displacement S, which satisfies a relation of $S=P_W$.

9. The multi-functional liquid crystal parallax barrier device according to claim 7, wherein the double-view vertical strip parallax barrier and the double-view slant-and-step parallax barrier achieve the optimization of the horizontal opening width of the light-transmissive element by properly reducing the horizontal opening width of the light-transmissive element for an amount of $\Delta B_W$.

10. The multi-functional liquid crystal parallax barrier device according to claim 9, wherein the reducing amount $\Delta B_W$ preferably has the following relation:

$$B_{W0}/3 \leq \Delta B_W \leq 2B_{W0}/3.$$

11. The multi-functional liquid crystal parallax barrier device according to claim 7, wherein the double-view slant-and-step parallax barrier achieves the optimization of the vertical opening width of the light-transmissive element by properly reducing the vertical opening width of the light-transmissive element.

12. The multi-functional liquid crystal parallax barrier device according to claim 3, wherein regarding the installation direction of the double-view vertical strip parallax barrier, when the flat panel display is arranged in a manner that the R, G, B sub-pixels are conFigured in the horizontal direction, the double-view vertical strip parallax barrier is installed accordingly with a long edge of an opening of the double-view vertical strip parallax barrier disposed in parallel to the vertical direction, and performs a view separation on the double-view 3D combined image at an optimal viewing point on an optimal viewing distance in the horizontal direction, so as to display the double-view 3D image; while when the flat panel display is arranged in a manner that the R, G, B sub-pixels are conFigured in the vertical direction, a multi-view slant-and-step parallax barrier is installed accordingly with a barrier horizontal line structure of the multi-view slant-and-step parallax barrier disposed in parallel to the horizontal direction, and performs a view separation on the multi-view 3D combined image at an optimal viewing point on an optimal viewing distance in the horizontal direction, so as to display the multi-view 3D image.

13. The multi-functional liquid crystal parallax barrier device according to claim 1, wherein the multi-functional liquid crystal parallax barrier device is disposed on a flat panel display screen capable of rotating for 90°, the flat panel display screen is formed by M×N R, G, B sub-pixel units, the single sub-pixel unit has a size of $P_W \times P_H$, where $P_W$ is a short edge width of the sub-pixel and $P_H$ is a long edge width of the sub-pixel, the two satisfying a relation of $P_H=3P_W$, the R, G, B sub-pixels are conFigured in a horizontal direction or a vertical direction, and the flat panel display screen displays a 2D image, a double-view 3D combined image for the double-view vertical strip parallax barrier, and a multi-view 3D combined image for the multi-view slant-and-step parallax barrier.

14. The multi-functional liquid crystal parallax barrier device according to claim 13, wherein regarding the multi-view 3D combined image for the multi-view slant-and-step parallax barrier, when the optimization condition of the optimal viewing distance has the relation of m=1, m'=3, and the horizontal opening of the light-transmissive element of the multi-view slant-and-step parallax barrier is corresponding to an image having a width of three sub-pixels, the multi-view 3D combined image $\Sigma_n$ displayed by the multi-view slant-and-step parallax barrier is expressed by the following formula:

$$\Sigma_n = \sum_{i=0}^{M-1} \sum_{j=0}^{N-1} V_\Lambda^{i,j}$$

when $j \geq i$, $$\Lambda = \mathrm{Mod}\left[\frac{\mathrm{int}\left(\frac{j-i}{3}\right)}{n}\right]$$

when $j < i$, $$\Lambda = \mathrm{Mod}\left\{n - \mathrm{Mod}\left[\frac{\mathrm{int}\left(\frac{i-j+2}{3}\right)}{n}\right]\right\}$$

where n is a number of views and $n \geq 2$; $V_\Lambda^{i,j}$ is a single-view image, $\Lambda$ is an index of the single-view image and has a relation of $0 \leq \Lambda < n$, and i, j indicate a sub-pixel position of an $i^{th}$ row and a $j^{th}$ column on the flat panel display screen; and int is a quotient function and Mod is a residue function.

\* \* \* \* \*